(12) United States Patent
Augenstein et al.

(10) Patent No.: US 7,972,082 B2
(45) Date of Patent: Jul. 5, 2011

(54) COLLECTION OF LANDFILL GAS AT VARIABLE RATES TO MATCH TEMPORAL NEEDS FOR ENERGY GENERATION

(76) Inventors: Don C. Augenstein, Palo Alto, CA (US); John R. Benemann, Walnut Creek, CA (US)

( * ) Notice: Subject to any disclaimer, the term of this patent is extended or adjusted under 35 U.S.C. 154(b) by 497 days.

(21) Appl. No.: 12/288,118

(22) Filed: Oct. 16, 2008

(65) Prior Publication Data
US 2009/0136298 A1    May 28, 2009

Related U.S. Application Data

(60) Provisional application No. 60/999,269, filed on Oct. 16, 2007.

(51) Int. Cl.
*B09B 1/00* (2006.01)
(52) U.S. Cl. .................................. 405/129.95
(58) Field of Classification Search ............ 405/129.95
See application file for complete search history.

(56) References Cited

U.S. PATENT DOCUMENTS

| | | | |
|---|---|---|---|
| 4,442,901 A | 4/1984 | Zison | |
| 4,444,041 A | 4/1984 | Zison | |
| 4,469,176 A | 9/1984 | Zison | |
| 5,063,519 A | 11/1991 | Zison | |
| 5,090,843 A | 2/1992 | Gringsby | |
| 5,335,535 A | 8/1994 | Ruthrof | |
| 5,857,807 A | 1/1999 | Longo, Sr. | |
| 6,169,962 B1 * | 1/2001 | Brookshire et al. | 702/47 |
| 6,283,676 B1 | 9/2001 | Hater et al. | |
| 7,448,828 B2 | 11/2008 | Augenstein | |
| 2003/0008381 A1 | 1/2003 | Augenstein | |
| 2005/0201831 A1 | 9/2005 | Lee et al. | |
| 2006/0034664 A1 * | 2/2006 | Augenstein et al. | 405/129.5 |

\* cited by examiner

*Primary Examiner* — John Kreck
(74) *Attorney, Agent, or Firm* — Hugh McTavish

(57) ABSTRACT

The invention involves a method of collecting biogas from a landfill with a variable rate of collection varied to match periods of greatest need for energy and greatest economic value of energy during a day. The variable collection rate is made possible by a landfill design that includes a gas permeable layer and a gas containment layer with gas collection from an extraction locus beneath the gas permeable layer. In some embodiments the landfill also includes a porous gas storage layer above the gas-permeable layer.

22 Claims, 13 Drawing Sheets

COLLECTION OF LANDFILL GAS AT VARIABLE RATES TO MATCH TEMPORAL NEEDS FOR ENERGY GENERATION

This application claims priority from U.S. provisional patent application Ser. No. 60/999,269, filed Oct. 16, 2007.

BACKGROUND

Landfilling and landfill gas. Landfilling and dumping dominate waste disposal in the United States, as well as waste disposal worldwide. The U.S. Environmental Protection Agency (EPA) estimates U.S. landfilling of Municipal Solid Waste ("MSW") at about 160 million tons annually over the past few years (U.S. EPA 2002) And, worldwide, even greater tonnages of organic solid wastes, several times those of the US, are landfilled and otherwise buried in dumps around the world In wastes either buried in landfills or simply dumped, organic components decompose to form "landfill gas" (LFG) or biogas. LFG (biogas) comprises approximately equal volumes of methane and carbon dioxide, with lesser amounts of other gases and moderate levels of pollutants. A representative reaction for methane generation from cellulose, the largest fraction of most organic waste, is:

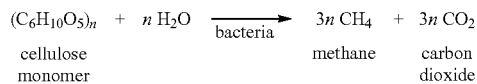

Importance of Landfill Gas Recovery.

The landfill gas ("LFG") has pronounced environmental impacts, and its recovery is of extremely high importance across the United States (U.S.), and worldwide, for a variety of related reasons:

1. Mitigating climate or "greenhouse" effect The climate or "greenhouse" effect of methane emitted from landfills is a major global concern, simply because of enormous amounts of organic wastes, hence methane emissions, involved. In climate terms, methane from landfills adds to (makes a difference of) 3 to 10% in the annual increase in radiative forcing due to buildup of all greenhouse gases in earth's atmosphere. In more simplified terms, the presence or absence of landfill methane emissions into the atmosphere can be considered to make a difference of about 3 to 10% in the "greenhouse effect"

2. Potential for renewable LFG energy The landfill methane recovered from landfills can be important as a fuel. It is usable with existing technology and equipment (Augenstein and Pacey, 1992). Available U.S. landfill methane, potentially recoverable (as of now, based on the US Energy Information Agency (EIA) and other statistics) but not exploited for energy, conservatively equates to the energy value of over 150,000 barrels of oil a day.

This amount of energy is significant in terms of improved national security and energy self-sufficiency for the U.S. Furthermore, because methane from wastes is nearly all from photosynthetically fixed carbon, this methane is a renewable fuel. It displaces the use of fossil carbon fuels, thereby lessening climate effects of fossil $CO_2$.

3. Other important reasons for landfill gas capture. Other important reasons for landfill gas control and recovery include (a) to mitigate methane effects on stratospheric ozone destruction, (b) to prevent emission of local air pollutants, (c) to mitigate of landfill methane migration and explosion hazards, and as well as odor problems, and (d) to develop practical, economic and cost-effective options for voluntary or non-voluntary greenhouse gas abatement actions, and practical options for carbon sequestration.

For all of these reasons, the recovery of landfill gas at high efficiency is a high priority to regulators as well as landfill owners and operators.

Notwithstanding the potential benefits of methane recovery, "conventional" landfill gas extraction is relatively inefficient.

Conventional Gas Extraction with Wells or Trenches.

The usual gas recovery approach is to use deep wells attached to a network of pipes and a gas pump (blower) that applies vacuum to extract the gas from waste. To illustrate performance of conventional systems, gas flow dynamics with "conventional" well (or trench) extraction are shown qualitatively in FIG. 1. FIG. 1 shows landfill 1 containing waste 2. A well 3 collects biogas from the landfill. Cover layers 4 are in contact with the atmosphere at the surface of the landfill. Arrows in FIG. 1 denote directions of gas fluxes, through (in and out of) a waste landfill surface, and within the waste. Gas flow velocity is denoted qualitatively by lengths of the arrows. Note the gas escaping to the atmosphere far from the wells. It is principally because of this LFG emission and loss far from the wells that gas capture is typically 60-85% (SWANA 1994. Solid Waste Association of North America Workshop on Landfill Gas Modeling and Recovery, 1994. Personal communications from participants). This inefficiency is acknowledged and estimated at 75% by the U.S. EPA (EPA, Peer et al. 1991, ICF, 2002) and California Air Resources Board. The inefficiency has been an accepted feature of extraction.

The profile of surface emission flux is recognized to lead to potential for some emissions away from the wells under most circumstances. Note also that there is almost always entrainment of gas, whether LFG or atmospheric air, through the surface area most proximate to deep collection. Both LFG emission far from wells, and air entrainment proximate to subsurface collection, are well recognized as deleterious to collection efficiency. A "tradeoff" exists between extracting or "pulling" at too high a flow rate and thereby entraining excessive atmospheric air, versus pulling too little and recovering less LFG. This poses one dilemma of conventional extraction.

Geomembrane over highly conductive layer: Zison. An invention that partially ameliorates inefficiency and air entrainment problems of gas collection by wells has been to collect by a surface geomembrane or a low permeability layer over a surface or near-surface highly conductive layer. (Zison, U.S. Pat. No. 4,442,901). A schematic of the Zison highly conductive layer recovery method is shown in FIG. 2. In FIG. 2, biogas is emitted by digestion of waste 2. The arrows show flux of the gas. Overlying the bulk of the waste is a gas-permeable layer 5. A surface geomembrane 6 is used to prevent gas escape from the gas permeable layer. Biogas is extracted (arrow 21) from the gas permeable layer 5.

Adjustment ("monitoring" or "tuning") of well extraction rates. A gas extraction system based on wells as in FIG. 1 cannot be simply installed and turned on. It must be adjusted ("tuned") to maximize recovery. Typical tuning gradually increases extraction rates from wells over time, until falling extracted methane levels at the wellhead indicate that air entrainment through the landfill surface, and into the collected gas, is too high. If methane content falls too far, the extraction rate must be reduced. Not only are LFG emissions far from wells, and the air entrainment proximate to subsurface collection recognized as deleterious to collection efficiency, but a "tradeoff" necessarily exists between extracting or "pulling" at too high a flow rate and thereby entraining excessive atmospheric air, versus pulling too little and recovering less LFG. Although gas extraction at sufficiently high rate to reduce gas pressure in the landfilled waste to below atmospheric can eliminate nearly all fugitive LFG emissions, the associated air entrainment dilutes gas and creates problems with energy uses.

The practice of constant rate extraction. Current conventional extraction practice (barring mishaps) has been to extract LFG at a constant rate 24 hours a day. For one thing, this is the easiest LFG extraction management approach, minimizing need and effort for operator adjustment. Once extraction rates, typically established by monitoring or "tuning," are established, the well vacuum and corresponding extraction rate are left alone for weeks or months that elapse until the next needed adjustment is made. Constant-rate LFG recovery has developed as standard practice in the LFG industry because it has been believed—and is widely validated by accepted measurement techniques—that an extraction rate near or slightly exceeding generation rate controls surface gas flux (both air in and LFG out) and, thus, controls surface methane emissions at least moderately well, i.e. to extents acceptable to operators and regulators. For most landfills, there is as noted already some degree of "overpull", i.e. extraction in excess of generation, so that rather significant air entrainment occurs, as indicated by gas compositions containing 5-30+% of atmospheric $N_2$ gas. ($O_2$ is absent or present in small amounts, being depleted by microbial consumption as the air passes through the landfill). This overpull has been found associated with best control.

New landfill designs that facilitate collection of landfill gas (biogas), and new methods of collecting biogas generated in landfills are needed. Preferably the methods and designs will allow for more efficient collection of biogas than previous methods (i.e., allowing less biogas to escape). Preferably the methods and designs also minimize collection of atmospheric air with the biogas and minimize the drawdown of air into landfills. Air contamination harms the quality and utility of collected biogas, and air drawn into a landfill creates a more oxidizing environment in the landfill that leads to consumption of methane by oxidation and inhibits the anaerobic microbial fermentation that produces biogas.

Preferably the LFG extraction methods would allow efficient and most advantageous use of the biogas collected. Many examples exist of cases where energy is more advantageous and valuable at certain times than others. A case in point is electricity demand and revenue from electricity sale. For most of the US the peak demand for electricity occurs during the day. The plants that provide for daytime or "peaking" electricity demand may run only during the day, that is, about half time. The power produced by such plants that run only about half time is correspondingly more expensive inasmuch as the capital and other fixed cost must be allocated over the plants' shorter run times. Thus the power necessary to meet daytime needs, or "peaking power" is more expensive than continuously generated: "baseload" power. If landfill gas can fuel power selectively during the daytime, that power can be sold at a premium that power necessary during the daytime can command. This is but one example of energy and power that is more valuable at some times than others. An Oct. 17, 2007, Wall Street Journal Article ("Electricity Demand Is Far Outpacing New-Supply Sources," by Rebecca Smith) states that growing demands along with delays in new power plant construction are such that demand threatens to outpace supply across the US. The Wall Street Journal article notes that much the greatest shortage is likely in "peaking" plants that must operate when necessary to meet maximum demands.

From the above it is clear that it would be desirable to use landfill gas selectively at times when its energy is most desirable.

To fuel "peaking energy" needs (such as heat or electrical power) with landfill gas, it is necessary that the extracted landfill gas fuel (biogas) be preferentially deliverable to the point of use at times of maximum energy need. One way to do this would of course be by storage in a storage volume or reservoir external to the landfill such as a storage tank. However all means of such external storage turn out to add expense that is prohibitive relative to the value or premium that may be received for peaking energy.

SUMMARY

One embodiment of this invention deals with the adaptation of a landfill so that LFG generated continuously around the clock may be stored within the landfill itself or storage volumes that are integral with the landfill. That stored gas may be withdrawn preferentially at times of high demand to meet "peaking" energy needs.

The invention provides an improved method of collecting biogas from a landfill that allows biogas to be very efficiently collected while minimizing entrainment of air into the landfill and into the collected biogas. Landfill designs and modifications that facilitate the method are also disclosed. The invention most importantly allows collection rate of biogas to vary within a day or diurnal cycle or between days to match the time of greatest energy need. This is termed "peaking" and allows the methane or energy to be collected at the time it may be most useful.

The method involves providing the landfill with an upper gas containment layer near the surface of the landfill to retard biogas escape and air entrainment into the landfill. This gas containment layer in one embodiment, however, is sufficiently porous so that it can serve for gas storage. It may most conveniently be comprised of landfilled waste itself, which is, at once, porous, and yet has a gas permeability which is at least tenfold less than the permeable layer below it as described next.

Underneath the gas containment layer (or closer to the landfill interior or center from the gas containment layer) is provided a highly gas-permeable conductive layer. This gas permeable conductive layer may consist of materials widely available to landfills, such as gravel or shredded tires. It may even very conveniently consist of material that must be landfilled in any case, such as rubble or construction and demolition debris. Biogas rises from the landfill into the gas permeable layer. Because of the low resistance to gas flow in the gas-permeable layer, the biogas, rather than continuing its rise to escape from the landfill through the gas containment layer, instead flows laterally in the gas permeable to an area above a deeper gas collection well, where the partial vacuum from the gas collection well draws the biogas downward into the landfill, toward the wellhead, to be collected at the gas collection wellhead. This reduces fugitive biogas emissions and improves collection efficiency.

Underneath the conductive layer (or, more generally, closer to the landfill waste mass center), a well withdraws biogas. Extraction from the well causes biogas to pass through the porous material intervening between the permeable layer and the extraction locus. The passage of gas from the permeable layer to the wellhead takes multiple paths and preferably requires over a day. Elements of gas from differing zones of the permeable layer have differing transit times from the permeable layer to the extraction locus. Because of differing transit times, as well as factors including mixing by molecular diffusion, elements of biogas mix together as the gases pass toward the wellhead for collection. In this way, the collected biogas represents a mixture of gases produced in different areas of the landfill over different times, and there is a time-averaged composition of gas that has transited to the well. This makes the gas collected from the well very consistent in its composition.

The method can be controlled and further improved by monitoring the gas composition of the gas-permeable conductive layer and cover layer, and adjusting the rate of biogas withdrawal from the well in response to the gas composition in the gas-permeable layer and cover layers. Withdrawal of biogas from the well creates a partial vacuum that draws gas from the gas-permeable conductive layer down through the waste mass to the well. If the rate of gas withdrawal from the well is too rapid, air will be entrained from the atmosphere into the cover layer and into the gas-permeable conductive layer. But if the rate of gas withdrawal from the well is too slow, biogas may percolate up through the gas-containment layer and the surface of the landfill to escape. Monitoring the gas composition of the gas-permeable layer and within the porous gas-storage layer allows one to determine quickly and continuously whether the rate of gas withdrawal from the well is too fast or too slow and adjust the rate accordingly. If the gas-permeable layer has too much nitrogen or oxygen, too much air is being entrained into the gas-permeable layer, and the rate of biogas withdrawal from the well is too fast. But if the gas-permeable layer contains no nitrogen or oxygen, the rate of biogas withdrawal from the well may be too slow, and biogas may be escaping from the surface of the landfill.

Because gas from different areas of the landfill mixes quickly in the gas permeable layer, and air entrained into the landfill anywhere reaches the gas permeable layer quickly, the composition of the gas-permeable layer reacts quickly to air entrainment. This allows quick adjustment of the rate of biogas collection to optimize the rate to match biogas generation rates and prevent excess air entrainment or biogas loss. In contrast, with a conventional landfill design, it can take weeks for entrained air to reach a collection well and then be detected in the collected biogas. Thus, with conventional extraction as illustrated in FIG. 1, a very long time is needed for adjustments. The time constant for response to adjustments is weeks long and the total time for adjustments can be several months. Furthermore, adjusting wells for changing generation or other factors is an ongoing and tedious process and feedback is also slow for such adjustment.

Another key aspect of the invention is collecting biogas at different rates over the course of a day. Biogas methane can be burned for heat or to drive turbines and produce electricity. The need for heat and especially the need for electricity varies over the course of a day and between different days. On hot days, more air conditioning is used, the consumption of electricity "spikes" during the hottest hours of the day to reach a peak, and more electricity is needed. In general more electricity is needed during the daylight hours than at night, because businesses operate in the day, air conditioning consumption is greater during the day, and people are more active during the day. Thus it would often be desirable to extract landfill gas selectively or on a varying diurnal cycle with highest extraction rate at the times it is needed to meet higher-than-average energy demands.

The invention involves varying the rate of biogas collection within a day to match the temporal needs for energy. The design described here of a gas permeable layer in combination with a gas containment layer facilitates this variable biogas collection rate while limiting variations in gas composition that would complicate energy use. Furthermore, the gas mixing in the gas-permeable layer and as biogas passes from the gas-permeable layer to the collection wellhead gives a relatively consistent composition to the collected biogas even when the rate of collection varies.

In addition to features described wherein the cover serves for gas storage, there may also be landfill sections containing porous material (such as construction debris or rubble that must be placed within the landfill anyhow) that can serve as additional volumes that can store biogas. A feature of such volumes is that they are connected with the permeable layer. LFG may be introduced and withdrawn from the landfill sections containing porous material providing storage with a "plug flow" residence time distribution so that LFG is stored and recoverable while diluted as little as possible from its temporary storage. Such volumes may for example comprise a section of the landfill containing the noted construction and demolition debris configured simply so that gas may be introduced or withdrawn from it. The composition of gas at points within such storage volume may be monitored to help with optimizing the extraction rate.

It is to be noted that to avoid undue biogas emissions, or undue air entrainment, the landfill gas extraction rate is most desirably controlled by closely tracking the volume where biogas storage occurs. When porous cover layers serve for storage, control is such that a diffuse interface results between entrained air nearest the landfill surface and biogas in the landfill zones beneath the interface.

Thus, one embodiment of the invention provides a method of collecting biogas from a landfill having waste and an outer surface contacting the atmosphere, wherein the landfill contains (i) at or near the outer surface contacting the atmosphere a gas-containment layer that has low gas permeability; and (ii) a gas-permeable layer toward the interior of the landfill from the gas-containment layer and toward the exterior of most of the landfill waste mass, the gas-permeable layer having at least 10 times the gas-permeability of the gas-containment layer. The method comprises: (a) collecting biogas from the landfill from a location toward the interior of the landfill from the gas-permeable layer with at least one gas-collection well that collects biogas from an extraction location toward the interior of the landfill from the gas-permeable layer and separated by waste from the gas-permeable layer and draws it to the surface, the well comprising a biogas-collecting wellhead at the extraction location and a conduit linking the wellhead to the surface to draw biogas from the wellhead to the surface. Step (a) involves collecting biogas at maximal rate for at least one hour and a minimal rate for at least one hour in the same day, wherein the maximal rate of biogas collection in a day is at least 20% more than the minimal rate of biogas collection in the same day for at least two consecutive days.

DETAILED DESCRIPTION OF THE INVENTION

Combining Permeable Layer with Deep Extraction, and Low-permeability External Containment.

Figure 3:
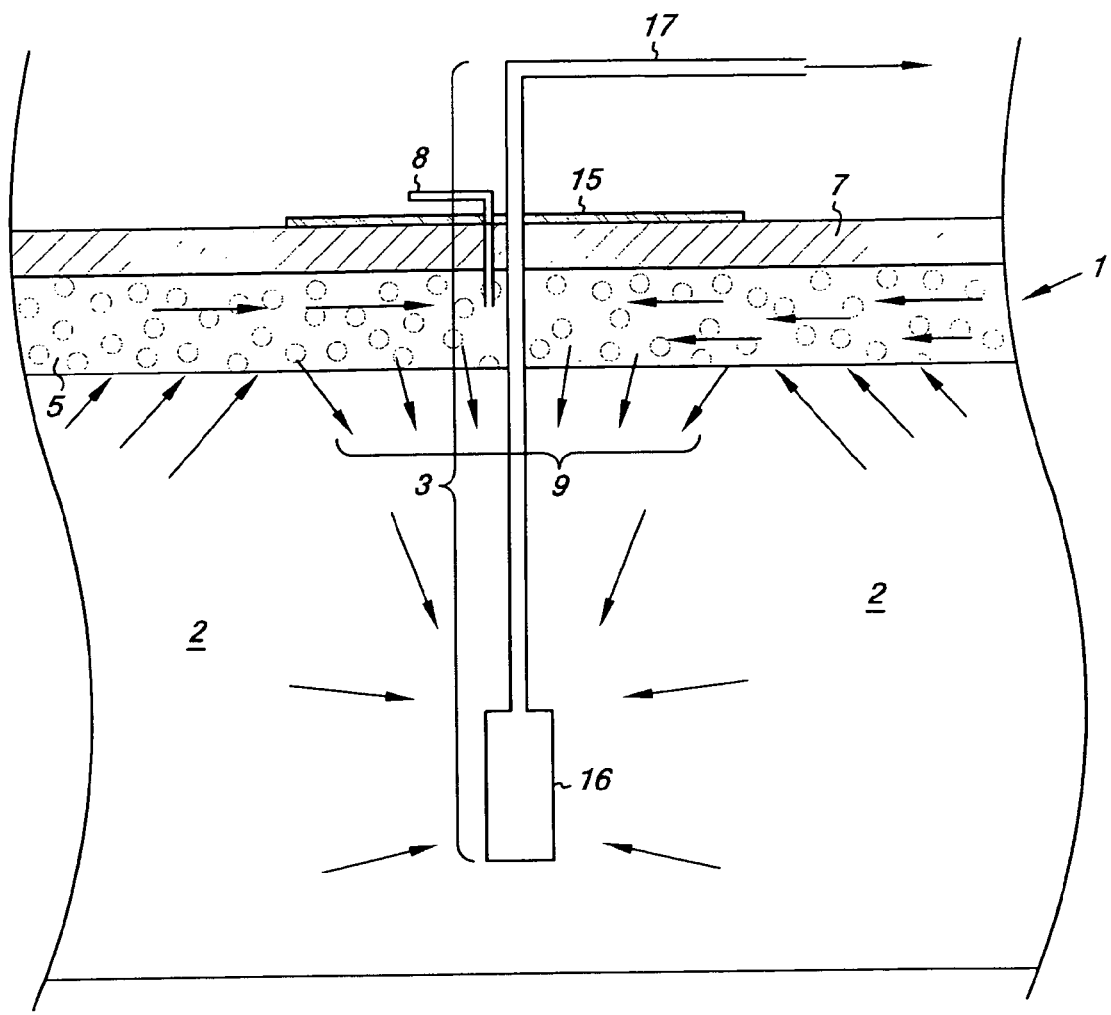
FIG. 3 is a schematic showing a landfill biogas-collection system and method of the invention. In this case the outer surface of the landfill faces up and permeable layer is horizontal, as would often be the case. Arrows denote gas flows.

The invention generally involves combining a low permeability gas-containment layer near the surface or other outer boundary of the waste, with a highly gas conductive layer underneath or more toward the interior of the waste relative to the gas-containment layer, and with extraction by the deep well(s) underneath, or toward the waste interior from, the gas-conductive layer. A schematic is shown in FIG. 3. Landfill 1 containing waste 2 generates biogas (biogas flows shown by the arrows). Biogas is collected and extracted through well 3. The well 3 includes a gas-collecting wellhead 16 and a (preferably gas-impermeable) conduit 17 linking the wellhead to the surface to draw biogas from the wellhead to the surface. The term "wellhead" refers to a section of the gas-extraction well where gas can enter the well, e.g. a section of pipe having slots or other gas-flow apertures cut in it. In the landfill gas industry, the wellhead is sometimes called a "slotline." Often, the wellhead is also surrounded with gravel. The term "wellhead" as used herein includes, for instance, a gravel-filled trench that is a collection point for biogas. The gravel-filled trench may be created during construction of the landfill, and later filed with waste, where a pipe connects the gravel trench to the surface to collect gas from the gravel-filled trench.

Overlaying the majority of the waste 2 is a gas-permeable layer 5. The gas-permeable layer is typically composed of a conductive porous matrix whose interstices provide gas flow paths. Often it is composed of rigid or semi-rigid particles of a large enough size to leave a significant void volume between particles. For instance, the gas-permeable layer may contain gravel, wood chips, or shredded tires. Above the gas-permeable layer is a gas-containment layer 7. The gas containment layer will have a conductivity for gas that is at least tenfold less than the conductivity of the gas-permeable layer. Biogas that rises from the landfill reaches the gas-permeable layer where its upward flow is impeded by the overlying gas-containment layer 7. Because the gas permeable layer is much more conductive than the containment layer, the biogas will preferentially migrate horizontally in the gas-permeable layer until it comes close to a well. Gas extraction from the well creates a vacuum that draws gas into the well. This vacuum draws biogas from the overlying gas-permeable layer down through the waste mass of the landfill to reach the well. The area immediately beneath the gas-permeable high conductivity layer 5 through which a substantial fraction (at least 30%) of the biogas from the gas-permeable layer passes as it travels to the gas-collection wellhead is the entrainment zone 9. On its passage through the waste 2, the gas from the gas-permeable layer mixes with biogas produced in the waste mass that has not gone through the gas-permeable layer. This helps to give a consistent content to the biogas that is withdrawn from the well. If gas is withdrawn directly from the gas-permeable conductive layer, the gas composition will vary more dramatically over time, sometimes containing a high air content and sometimes not.

Preferably the landfill also contains a sensor or sensors to sample and sense gas composition in the gas-permeable layer. An example sensor is represented by 8 which terminates in the gas-permeable layer to sample within that layer. However sensor(s) may also sample from the cover or containment layer. Air inevitably permeates most landfill containment, and air intrusion can almost always occur and has the potential to be a problem. If the gas-extraction rate from the well 3 is too high, air intrusion gases, e.g., nitrogen, oxygen, or argon, will be detected at high levels in the gas-permeable layer, as they are pulled into the containment layer and gas-permeable layer from the atmosphere by suction created by the gas-collection from the well. (Nitrogen is the preferred gas to monitor for detection of air contamination of the landfill gas of the gas-permeable layer.) If the gas-extraction rate from the well 3 is too low, biogas will tend to escape from the landfill by rising at points distant from the wells. If no air gases are detected in the gas-permeable layer or the containment layer, the gas extraction rate from the well 3 may be too low.

The permeability of the gas-permeable layer and the gas-containment layer can be assessed using measurements on typical material samples and applying the generalized Darcy equation:

$$\Delta P/\Delta L = \mu V s/D$$

Where
  $\Delta P$=pressure drop, appropriate units
  $\Delta L$=distance gas flows,
  D=permeability proportionality constant (often expressed in Darcys)
  $\mu$=viscosity
  Vs=superficial gas velocity in cm/sec.
or $$D = \frac{k(Vs)\Delta L}{\Delta P}$$

where
  D=permeability in Darcys.
  $\Delta P$=pressure drop in dynes/cm$^2$.
  Vs=superficial gas velocity in cm/sec.
  $\Delta L$=distance gas flows, in cm.
  k is a proportionality constant determined by measurement.

The measurements of materials' permeabilities may be made in laboratory settings, by correlating controlled gas fluxes with measured pressure drops in the laboratory setting. Or the permeability may be taken from literature and other compilations of typical solid waste and permeable layer properties. A typical example of such a compilation, satisfactory for ash and landfilled waste is contained in the PowerPoint presentation of Professor Toshihiko Matsuto, 2004 "Air Permeability, Diffusion Coefficient and Tortuosity of Incineration Ash" from the Third Intercontinental Landfill Symposium (Sapporo, Japan, December). Permeabilities are usually expressed in terms of typical upper and lower limits.

Permeabilities are often expressed in Darcys. A Darcy is that amount of permeability allowing a flow of 1 cm/sec superficial velocity fluid having viscosity of 1 cp through a pressure gradient of 1 atmosphere per cm. The viscosity of LFG can be taken, to a close approximation, as $1.3 \times 10^{-4}$ poise, or about 1/70th that of water and its volumetric flow would, thus, be about 70-fold that of water at a given pressure gradient.

Also, if the layers can be approximated as composed of rigid spherical particles, gas permeability can be calculated. Gas permeability is proportional to the square of the pore size between particles. Also, the flow properties of layers of a porous matrix can normally be approximated as composed of rigid spherical particles or "equivalent spheres."

The permeabilities may also be computed using correlation such as the Ergun equation: (cited from McCabe and Smith, Unit Operations of Chemical Engineering, McGraw Hill, 1993). The equation is $$\Delta P/\Delta L = 150 V_s \mu (1-\epsilon)^2 / \Phi^2 Dp2\epsilon^3 + 1.75 \rho V_s^2 (1-\epsilon)/\Phi Dp\epsilon^3$$

Where
$\Delta P/\Delta L$=Pressure gradient in dynes/cm$^2$ per cm path length.
Vs=superficial LFG flow velocity based on empty cross section, cm/sec.
$\mu$=viscosity (LFG=$1.3 \times 10^{-4}$ Poise).
$\epsilon$=void fraction in porous layer, estimated from bulk density.
$\Phi$=shape factor, (1 for spheres).
Dp=particle diameter (an "equivalent sphere" can be defined for a porous matrix).
$\rho$=liquid density.

To establish a permeable layer, materials that establish large pore spaces and flow paths are laid in a layer in the landfill. Suitable readily available low cost large pore dimension materials such as gravel, tire shreds, rubble, wood chips, brush, or the like can be used. These are far more gas permeable than household waste.

Commonly available, economical materials such as those mentioned have ratios of permeabilities to gas flow ranging from roughly 2 to 6 orders of magnitude (one hundredfold to one millionfold) greater than the permeability of landfilled waste. They can thus direct or enable gas flow preferentially along desired paths or directions.

The permeable layer preferably covers substantially all area served by an extraction well. An ideal, of near-total (90-99+%) permeable layer coverage of the LFG-generating waste volume to be served by a well and permeable layer, assures maximum capture of gas from that waste volume. Although total or near-total permeable layer coverage is ideal, modeling shows that any degree of fractional permeable layer coverage over the deeper extraction locus of the well assures capture of more generated LFG than allowed by conventional practice without any such permeable layer being present. At a practical minimum the permeable layer should cover a major fraction—at least 50%—of the area served by a given single extraction well. All parts of the permeable layer should enable flow entering the permeable layer though connecting permeable layer flow paths, ultimately to be entrained from the entrainment zone of the permeable layer down through waste to the extraction locus or well.

The extraction of gas is preferably from waste beneath the highly conductive permeable layer, rather than from the layer itself. This is because an important aspect of the invention is the mixing of gas (predominantly LFG) entrained from the conductive layer on transit to the extraction locus. The criteria for necessary mixing which is a critical aspect of the invention will be presented shortly below.

There may be more than one permeable layer. While multiple horizontal permeable layers are possible, for such reasons as facilitating LFG collection during filling (Augenstein et al., U.S. provisional patent application Ser. No. 60/931, 727), we note that discussions here largely concern the permeable layer nearest the waste landfill surface with the atmosphere. In the case where multiple permeable layers are present they optionally may be interconnected by a vertical gas conduit so that the composition of gas converging on and entraining into the vertical conduit may be sampled and composition used to assess air entrainment, collection efficiency and need for control. The extraction well preferably is located beneath the surface of the permeable layer closest to the atmosphere.

Figure 4:
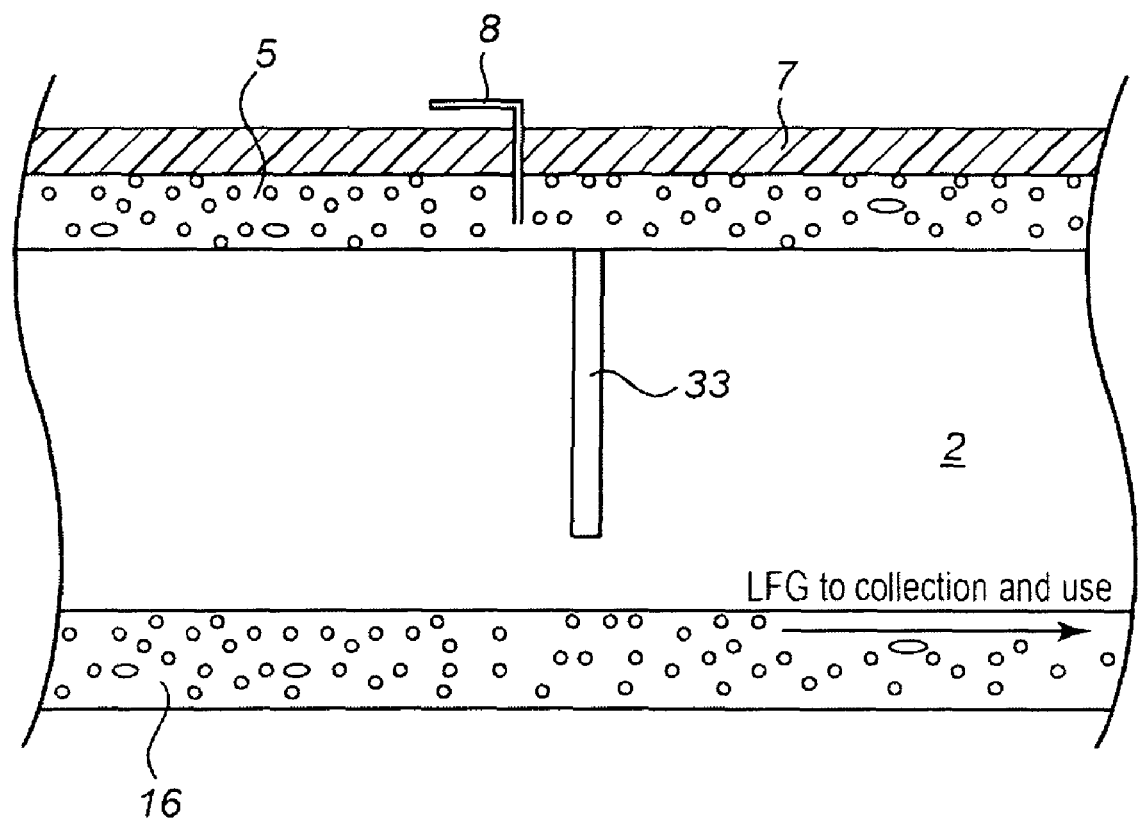
FIG. 4 is a cut-out view of a landfill with a permeable layer.

Instead of a vertical well with extraction locus separated from the permeable layer as shown in FIG. 3, the extraction locus can be the base layer of the landfill, where gas is extracted from the base as shown in FIG. 4. The base layer is labeled 16 in FIG. 4 since it functions as a wellhead for gas collection. The use of the base layer of the landfill as the extraction locus poses the problem of where to sample the gas content of the permeable layer to detect air intrusion. Without a well defined point to sample "representative" permeable layer gas, the gas composition in the permeable layer preferably would be sampled at numerous points. Otherwise localized air passage through the cover and into the permeable layer might not be detected. To circumvent this problem a low resistance flow path 33 can be provided. The low-resistance flow path 33 can be a vertical conduit. It will result in preferential gas flow to a point over the flow path 33 in the permeable layer 5. Thus, gas in the permeable layer will mix at that point and a sampler 8 can be placed at that point to monitor gas composition to reveal the presence of air intrusion. The number and spacing of low resistance flow paths would be determined specifically for particular landfills. (But even without such a low-resistance flow path as is shown in FIG. 4, the low resistance within the permeable layer will promote mixing so that the composition of the permeable layer at different points will be more averaged and more similar than would the gas composition at different points within the ordinary waste mass of the landfill.)

Figure 1:
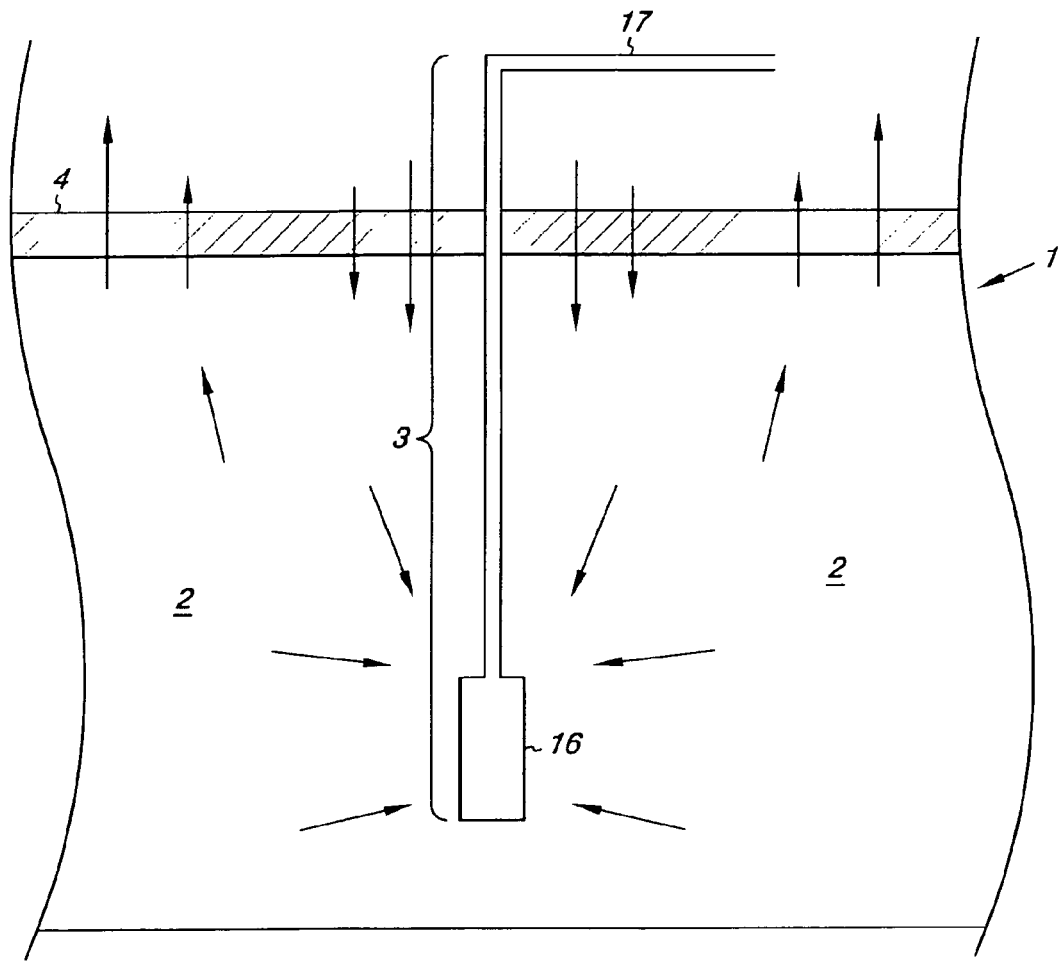
FIG. 1 shows a prior art landfill biogas collection system.

Improvements and benefits associated with present invention. This arrangement improves and optimizes extraction by several effects:

1. Improved gas quality. The extraction from the large deep void LFG volume in the landfill, in combination with re-entrainment of LFG emitted far from the wellhead, gives mixing of LFG on its way to the deep wellhead, and relatively constant gas composition and high quality from the large deep reservoir comprised of the voluminous total of deep voids. The composition of this deep void gas will be constant or very slowly changing. The constancy of composition is due in part to three factors: (a) The mixing of LFG produced in different areas of the landfill and any entrained air in the permeable layer. (b) The mixing in passage through the waste. Even if composition of gas entering the entrainment area may vary somewhat over hours or days, the multiple flow paths and associated dispersive and diffusional mixing as the gas moves toward the deep extraction zone will "time average" the concentration and minimize variations. (c) Given the long transit time of gas from the surface entrainment area to the deep extraction zone, diffusion will tend to further even out the composition variations. The constant composition of gas ideally means the gas from deep well extraction is suitable for all of the common LFG energy uses.
2. Improved fractional capture. The surface low-permeability barrier layer or geomembrane in combination with the highly conductive layer improves capture. The high conductivity layer allows preferential flow of any LFG emitted into the conductive layer to re-entrain and recapture in the entrainment zone over the deep extraction well(s). Capture can thereby be increased to over 90% of generated gas with proper adjustment, (adjustment discussed below). The cover layer both restricts escape of LFG to the atmosphere and minimizes infiltration of atmospheric air. It is important to note that infiltration of air otherwise occurring with conventional LFG extraction by wells, as shown in FIG. 1, is deleterious, interfering with LFG recovery by inhibiting LFG generation and also diluting recovered LFG.
3. Fewer gas collection wells. Because of its high conductivity for LFG and the gas flow patterns shown, incorporating the permeable layer allows wider separation of gas wells than would be possible without the permeable layer. LFG that reaches the conductive layer is able to flow horizontally until it reaches the entrainment zone in the vicinity of a well. In conventional landfill design, this horizontal flow to an entrainment zone is not possible and generated LFG is more likely to escape into the atmosphere unless the spacing between wells is decreased. The degree of increase in spacing between wells based on a four order of magnitude greater permeability of permeable layer relative to overlying cover and underlying waste would be at least a factor of 2.
4. Benefit to speed of monitoring and adjustment. A benefit to the near-surface highly conductive layer is the greater rapidity and precision with which adjustments can be made. Next is presented a brief discussion of conventional extraction adjustment, followed by a discussion of the invention's advantages in this regard.

Comparison to conventional deep well extraction adjustment A gas extraction system based on wells as in FIG. 1 cannot be simply installed and turned on. It must be adjusted ("tuned") to maximize recovery. Typical tuning gradually increases extraction rates from wells over time, until falling extracted methane levels collected from the well indicate that air entrainment through the landfill surface, and into the collected gas, is too high. If methane content falls too far, the well must be throttled down. Because of the very large volume of void gas relative to extraction rates, and imprecision and lags of feedback, the time constant for adjustments is long and the total time for adjustments can be several months. Furthermore, adjusting wells for changing generation or other factors is an ongoing and tedious process and feedback is also slow for such adjustment.

Extraction rate adjustments, and avoiding overpull or underpull with the invention. With the present invention, too rapid extraction or "overpull" or insufficient rates of extraction, "underpull," are rapidly determined compared to conventional well extraction. This is because with "overpull," entrained air reaches the highly conductive layer in a small fraction (down to a few percent) of the time that is required for air to reach the extraction zones of deep wells (the wellhead). Gas can be sampled from one or multiple points within the highly conductive layer near the zone of entrainment over the extraction well as indicated in FIG. 3. Gas composition near the entrainment zone will indicate air infiltration anywhere served by the highly conductive layer. Furthermore, with some additional calibration effort the composition can provide the very useful ratio of air entrained to gas generated. And extraction rate can be "tuned" quickly and precisely to match generation, from observing falling highly conductive layer methane or increasing nitrogen content. Deep well extraction rate is simply increased until nitrogen begins to appear in the sampled gas from the highly conductive layer sample zone shown in FIG. 3. When slight amounts of nitrogen appear, nearly all LFG is being extracted. The situation is complicated somewhat by the mentioned barometric effects, but extraction efficiency would be over 95%. In practice, if highest efficiency capture and emissions abatement are required, there should be slight "overpull" that would assure gas capture in the presence of flux changes due to the mentioned barometric variations As the operation is described above, it is possible that LFG concentration will vary by location (location coordinates whether in xy or radial system) on its way to the entrainment zone abutting the conductive layer. For example more LFG dilution by entrained air will be seen in LFG in the flow near areas where air entrainment through the cover is occurring. It will be desirable in many cases, particularly for accurate material balances and quantifications of air entrainment, to have accurate but "averaged out" composition of that gas collected in the conductive layer that is then entrained into the surface over the deep well. For this purpose it may be desirable to constrain some defined portion of gas entraining over the deep well to "average out composition" by mixing before entrainment. Entraining gas can be constrained to flow through a narrow aperture in a cover over the entrainment zone, and thereby mix and give such an average composition that can be sampled. Values for (a) air/nitrogen content in the entraining LFG and (b) Air/nitrogen content in the gas collected from the deep wellhead can provide the basis for a complete material balance from which both fractional recovery and fractional air entrainment can be accurately estimated.

Figure 5A:
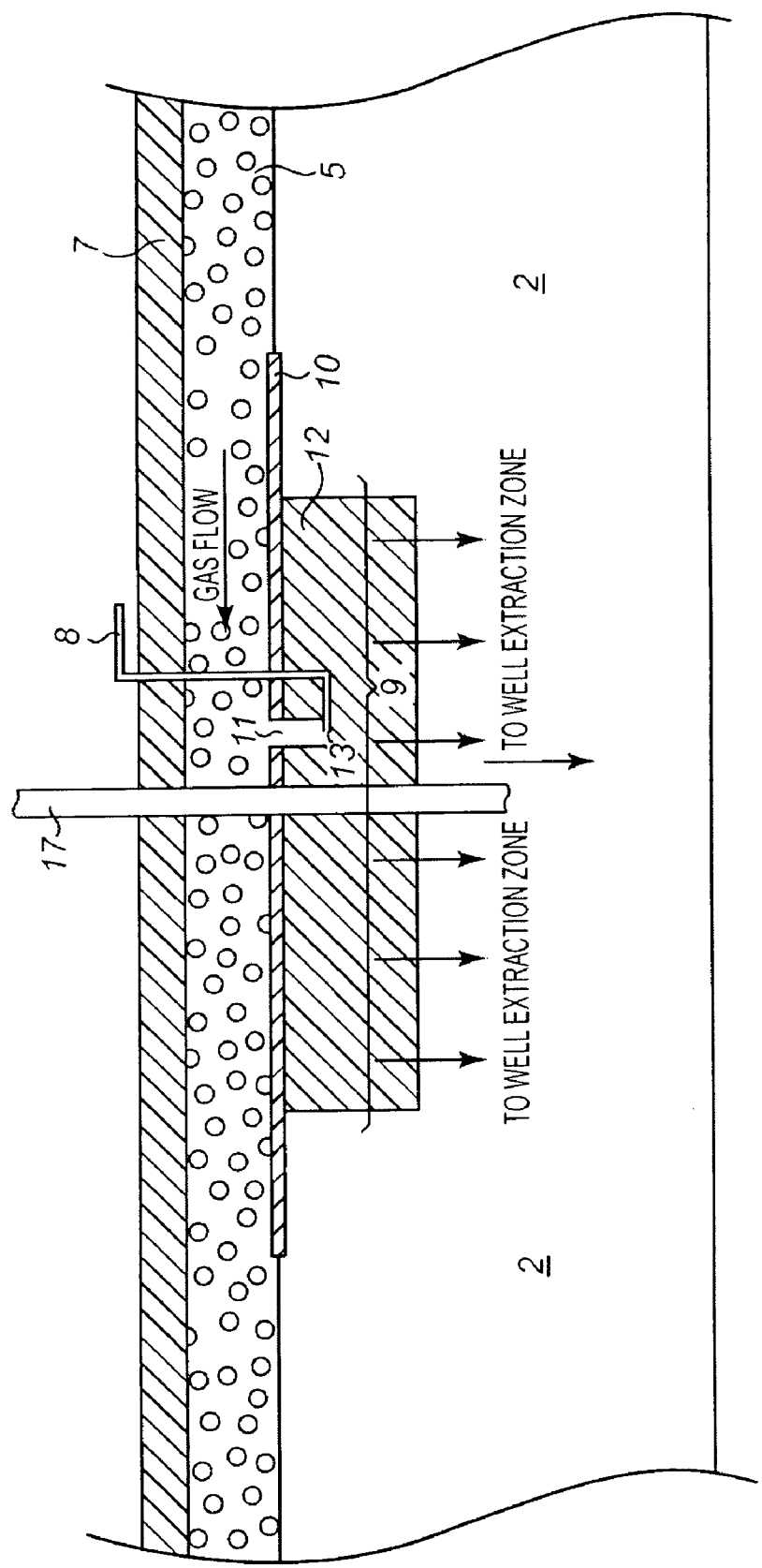
FIG. 5A is a side view of an embodiment of a landfill biogas collection system of the invention having a membrane with an aperture under the gas-permeable layer to facilitate accurate monitoring of the gas composition of the gas-permeable layer.
Figure 5B:
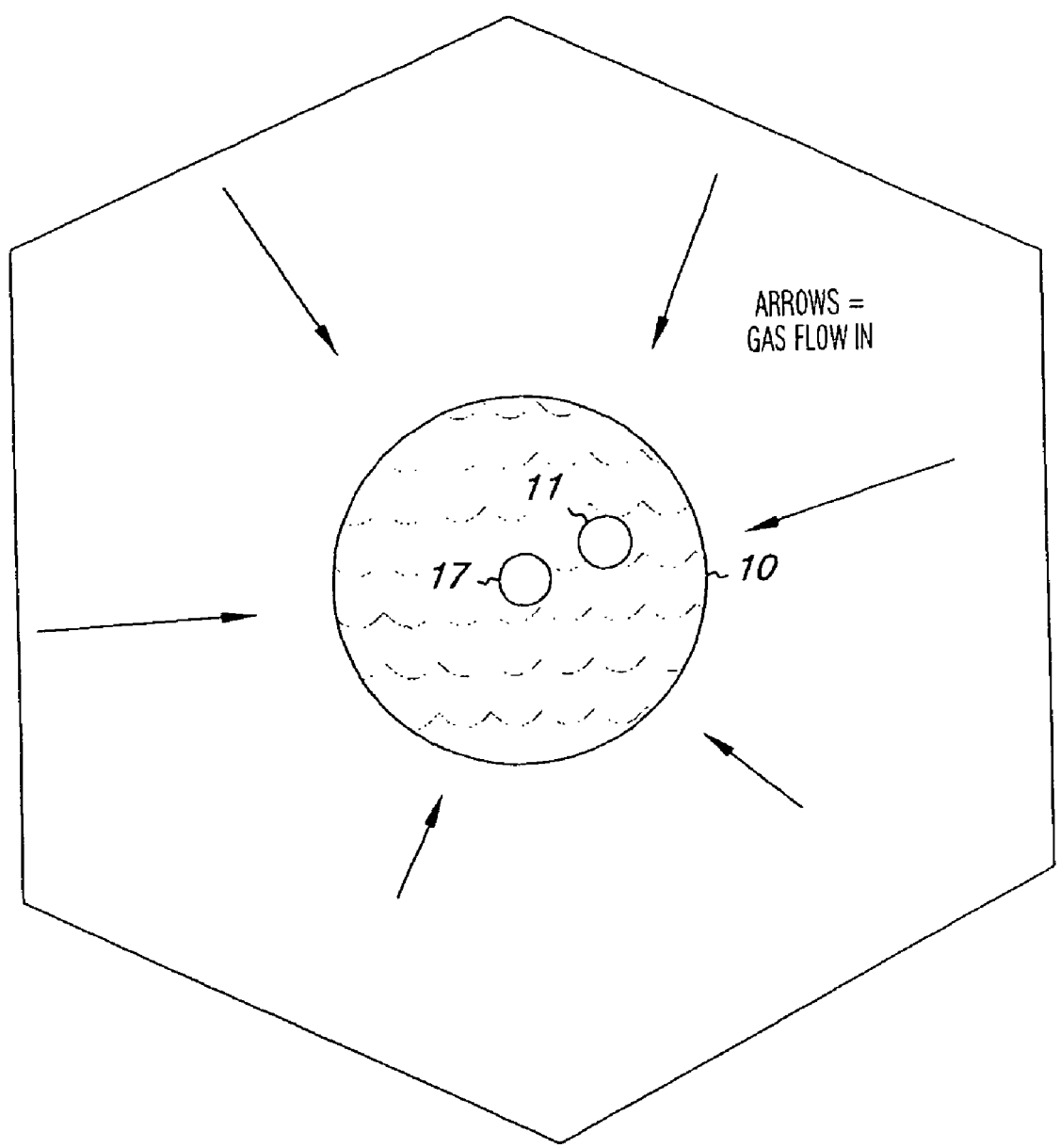
FIG. 5B is a top view of the membrane of FIG. 5A.

FIGS. 5A and 5B detail one arrangement where the composition of gas reaching and entraining into a circular zone over the deep well is collected and mixed at one point where its averaged composition can be assessed. The near-well entrainment zone 9 is covered by a relatively gas-impermeable membrane 10. The membrane has an aperture 11. If the membrane 10 covers most or all of the entrainment zone, most of the gas drawn from the gas-permeable layer 5 toward the well must pass through the aperture 11 in the membrane 10. Preferably the membrane 10 lies over a conductive sublayer 12, of radius less than the membrane, so that substantially all gas entering the entrainment zone from the submembrane conductive layer is mixed at aperture 11 before entraining. This mixing averages out local variations in the composition of gas in the gas-permeable layer, so sample point 13 near or in aperture 11 is an ideal point to sample the composition of gas in the gas-permeable layer. From compositions of entraining gas and collected exit gas from the well, material balances and flows can thereby be accurately determined by techniques well known to those skilled in the art of gas extraction from landfills. These techniques are discussed next.

FIG. 5B shows another view of membrane 10, showing the aperture 11 in the membrane and the point through which the conduit 17 of the gas-collection well passes.

4. Near-well composition as an indicator of acceptable entrainment. In many circumstances, and particularly at longer terms, providing atmospheric air entrainment is only through the upper landfill surface or a single waste face, it will be possible to establish the ratio of LFG collected via direct transmission through the waste mass to the well (without that LFG passing through the conductive layer) to that entering the entrainment zone via the conductive layer. Once the reasonable steady state is reached, the ratio of total gas extraction (measured flow of the exit stream) to the transmission within the conductive layer is very closely equal to the nitrogen content of gas sampled at the midpoint of the entrainment zone most proximate to deep extraction divided by the nitrogen content in the extracted stream. (This can be shown by flow modeling, detail omitted.) The LFG extraction rate is also known. As a time average, all excess of extraction flow over generation will be reflected in air entrainment and close-to-linear increase in nitrogen content measured at given points in the extraction area. Given a desired or target nitrogen content in the exit gas (for instance, 2-15%), simple calculations based on exit flow, and the conductive layer flow to the total flow will give the desired extraction rate to meet the desired or target nitrogen content.

5. Limiting transmissivity of the surface with a suitable membrane. By modeling, it can be determined that the risk of undesirable air entrainment through the low permeability cover layer will be greatest directly over the location of maximum entrainment. It may therefore be desirable to place an even more impermeable layer such as geomembrane 15 directly over the zone of entrainment of gas from the permeable layer, that is created by the deep well. This is shown in FIG. 3.

Some key parameters of the present invention: It is preferred that the highly conductive layer will be near the landfill exterior surface (within 12 feet of it although it should be overlayed with waste or soil serving as part of the "containment" or "barrier" layer). The fractional coverage of the landfill mass by the permeable layer must be substantial to intercept any desired high fraction of emissions and/or preclude air entrainment. The fractional coverage is easily and most desirably total. The ratios of the highly conductive layer permeability to permeability of the low permeability cover serving for gas containment must be such as to allow gas exiting farthest from the deep well, where collection is least efficient, to be transmitted with high efficiency to the entrainment area over the deep well where it is re-entrained.

Dealing with Problems: Addressing Surface Breaches or Channeling

Based on experience, it is likely that the proposed landfill cover layers may develop breaches, or areas of high gas (either LFG or air) transmissivity. Such "leaky" areas can be addressed by the following steps (a) Reduce extraction to a value less than generation.

(b) With a means to detect surface emissions, track down those areas of LFG emissivity. The means could include infrared optical density (FTIR) or combustible gas detector, i.e. FID, or other workable means known to those skilled in assessing gas emissions from landfills.

(c) Seal the cover breach with soil, membrane or other means.

The surface breaches do not become critical until transmissivity and resultant gas flow through transmissive areas or breaches become problematic, because of transmissivity in the presence of extant pressure gradients. Problematic situations could then arise as the result of (a) excessive air entrainment in the course of extraction, thus inhibition of methane generation and/or too much dilution, or (b) low fractional extraction. The system must in any case function to allow re-entrainment of LFG entering the highly conductive layer and the LFG conducted and re-entrained into the waste as shown in FIG. 3.

Economics

Comment can be offered here on the likely economics as of permeable layer use as of the time of filling.

Calculations similar to the numerical analysis in Example 1, Appendix A show that use of permeable layers will result in an increase of 10-30% in recovered gas. For more background, the commonly used EPA default recovery of 75% could be raised to 95+% as exemplified by the numerical analysis of Example 2 in U.S. patent application Ser. No. 11/187,639 (publication no. US 20060034664). An increased recovery is assumed here. A blower outlet gas value of about half of current natural gas energy prices, or $3/mmBtu can also be assumed. Further assumptions are that (a) the landfilled waste averages 100 feet deep at 50 lb/ft$^3$, for a total of 2.5 US tons/ft$^2$ landfill footprint, and (b) the collective gas generation over time is 2500 ft$^3$ CH$_4$/ton. The extra energy over time at 20% more recovery of generated gas would be 1250 ft$^3$ CH$_4$/ft$^2$ landfill area. With the value of methane assumed at $3.00 per thousand cubic feet (which is a conservative assumption), this extra methane has a value over time of $3.75/ft$^2$ landfill area. The current value of the extra energy (however used) must by normal business standards equal the worth of placing the permeable layer at final capping. Such permeable layer placement has been estimated at $1.00/ft$^2$, so application of the invention to a larger landfill would seem well within the realm of economic practicality.

Adjustment ("monitoring" or "tuning") of well extraction rates. One problem with conventional landfill design and gas collection systems is that even at the optimal collection rate, LFG may escape at points far from wells at the same time that air is entrained at points close to collection wells. Thus, it is often not possible to find an optimal point where no LFG escapes and no air is entrained. A "tradeoff" necessarily exists between extracting or "pulling" at too high a flow rate and entraining excessive atmospheric air, and pulling too little and recovering less LFG. Although gas extraction at sufficiently high rate to reduce gas pressure in the landfilled waste to below atmospheric can eliminate nearly all fugitive LFG emissions, the associated air entrainment dilutes gas and creates problems with energy uses.

Another problem with conventional extraction as illustrated in FIG. 1 is the long time needed for adjustments. The time constant for response to adjustments is weeks and the total time for adjustments can be several months. Furthermore, factors such as rainfall amounts, digestion of existing waste, and the nature of newly added waste change the rate of biogas generation, which requires ongoing adjustment. Feedback is slow for such adjustment. These aspects pose dilemmas with conventional extraction.

Figure 6:
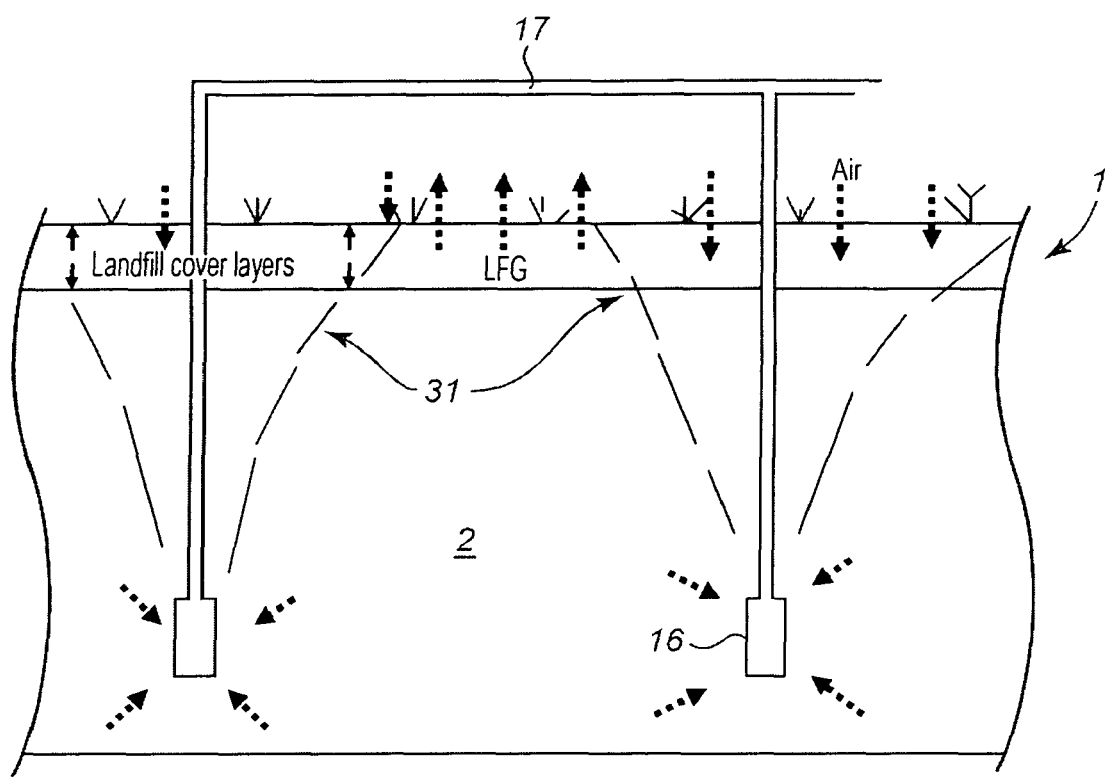
FIG. 6 is a diagram of a conventional landfill showing an LFG/air interface in the landfill. Arrows denote LFG or air flow. The dashed line 31 shows an interface between entrained air and LFG.

The situation illustrated in FIG. 1 can be visualized from another standpoint that illustrates the balancing between LFG extraction and air entrainment. Conventional deep well extraction (without permeable layer present) may be considered to result in an interface between entrained air (in waste areas toward the atmosphere) and LFG deeper in the waste mass. FIG. 6 portrays a cross section of a typical landfill between two wells showing such an entrained air/LFG boundary 31 represented by a dashed line. The air is entrained because conventional wells are typically adjusted so that some air entrainment is occurring to limit fugitive emissions. This reduces the measured methane content in the extracted gas from the "pure" LFG content of 55% methane to a lower target typically between 40-52%. Adjustment so that some air entrainment occurs assures that large fractions of LFG are not escaping to the atmosphere. Although this adjustment limits emissions to the atmosphere, they still occur as shown in FIG. 6

Current practice with conventional landfills is to extract biogas at a constant rate, 24 hours per day, 7 days per week. The rate is adjusted only every few weeks or months.

That constant-rate extraction works in reasonably satisfactory manner is indicated by results of integrated surface scans that assess emissions of operating landfills. The integrated surface scan is often mandated at prescribed intervals, sometimes several times a year, by Clean Air Act and EPA and many state rules. Extraction must be effective enough so that in a traverse under specified meteorological conditions of a surface gas sampler over the larger landfills, (with 2.75 million tons and above design capacity in the US) combustible gas detectors show average concentrations below 500 ppmv. (Higher emission "hot spots" must be sealed when found). Measured concentrations are normally several-fold lower than the threshold of 500 ppm. Conformance to the surface scan criterion indicates high effectiveness of this practice.

Perturbations.

Although extraction of the biogas that is generated is often regarded and treated as a steady state process, "perturbations" to the extraction process are almost always present. Perturbations arise from factors aside from generation itself, that increase or decrease volume of the LFG inventory contained in the deeper gas-filled voids of landfilled waste. Perturbations arise from errors in extraction rate, extraction adjustment, barometrically induced fluctuations, and purposeful variations in extraction rate for reasons described below. Perturbations can have adverse effects, exacerbating the problems, described above, of both air entrainment and fugitive emissions.

1. Imperfect adjustments of extraction are common. During trial and error adjustments, mismatches between trial extraction rates and the rate that achieves the best balance between fractional LFG extraction and air entrainment, normally occur. Departures of the extraction rate from a desired optimum also easily and routinely arise due to factors such as LFG collection manifold vacuum changes or due to slowly changing rates of LFG generation in the sector served by the extraction. Too high an extraction rate increases the undesirable air entrainment. Too low an extraction rate results in an undesirable increase in fugitive emission.
2. Barometric perturbations have substantial but subtle influences on extraction, and these have tended to be ignored in LFG extraction operations. Despite cover and containment, there is nearly always pressure communication and equilibration of pressure of the gas in void spaces or interstices of the landfilled waste ("void gas") with the ambient (barometric) pressure of the atmosphere. Such pressure communication is documented and discussed by (for example) Bentley et al (2002) and Johnson et al. (2005). The void gas expands and contracts with barometric fluctuations in accordance with Boyle's Law describing the inverse relation of gas volume to absolute pressure. Given typical gas-filled void totals in landfilled waste, and barometric changes frequently of the order of 1% absolute pressure in a day, this volumetric rate of expansion or contraction is in fact very substantial relative to the volumetric rate of LFG generation itself. Without extraction from the landfill this LFG expansion or contraction can in turn cause fugitive LFG and gas flux (gas advection) into the atmosphere to easily (as an example) vary over short terms from zero to approximately twice the mean. In the case of constant rate extraction, barometric fluctuations superpose fugitive emissions of near surface gas in times of falling barometer and increase air entrainment undesirably in times of rising barometer.

An example, with detailed analysis, to illustrate the types of flux variation that may occur due to barometric fluctuations is presented in Example 1, Appendix A. Such flux variations are clearly great enough to pose serious control problems.

The effect of expansion and contraction on content and composition of void gas is also described in literature by Young 1991. The effect of barometric fluctuations in moving the "interface" between LFG and entrained air of FIG. 2 has been described in terms of its consequences by Johnson (2005).

3. Variable rate landfill gas extraction and "peaking" Conventionally, LFG (extracted in accordance with FIG. 1) has been collected at constant rates. It routinely fuels constant 24 hours a day "baseload" electricity or other energy demand that can accept fueling by the constant-rate LFG supply.

Notwithstanding conventional practice, it could be highly useful to vary LFG extraction rates to respond to variable and increasing/decreasing energy demands. Demands for energy that could be fueled by landfill gas can clearly vary with time. LFG fueling of electric power provides an excellent case in point. Typical usage of electric power in the US is generally over twice as great in the day as in the night. It would be highly desirable, where possible, to shift landfill gas fueled electrical generation to operate as much as possible preferentially during the day when power use is highest, rather than use it during the night when need for electrical power and value of that power is less. The higher power generation in response to need is known as "peaking power" Such "peaking power" is welcomed by administrators of electric systems. There are numerous other situations (such as with process heat demands) where energy needs will vary and require variable amounts of landfill gas fuel with time.

Peaking operation—discussion: With peaking power, such as to meet daytime electrical or a maximum energy demand, the long-term average gas extraction rate will be kept at close to the same average rate as with constant rate extraction, because the rate of gas extraction is the same. However the extraction rate during peaking demand can be severalfold the rate when energy demand is a minimum.

Figure 7:
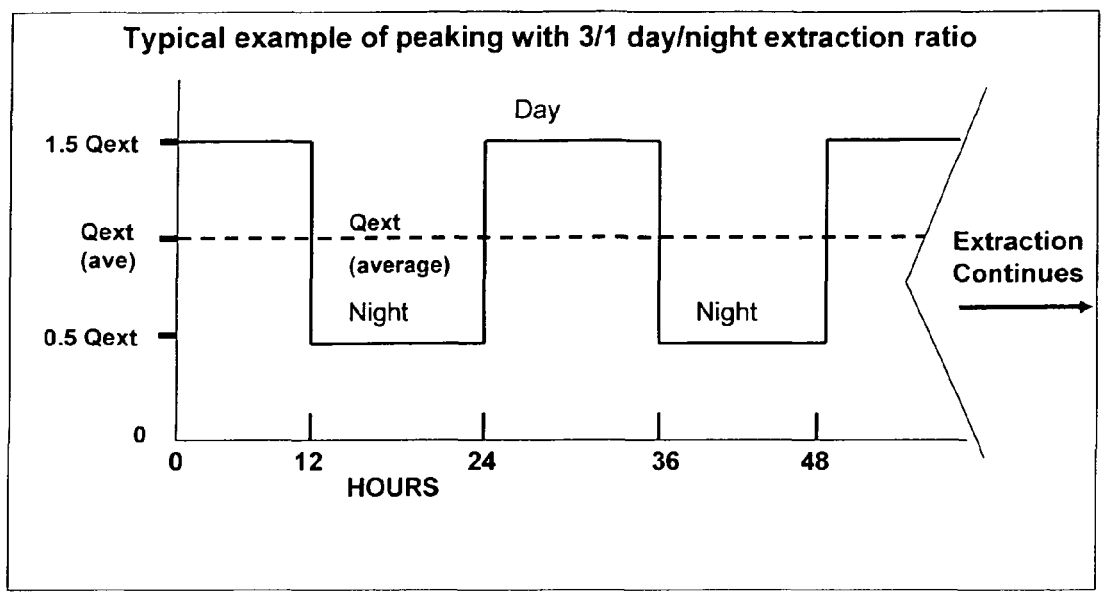
FIG. 7 is a time graph of gas extraction rate with peaking using a 3:1 day:night extraction ratio.

A peaking LFG extraction profile would be where extraction over time, in contrast to current practice, is varied in response to demand. A typical peaking operation extraction profile vs. time might be as shown in FIG. 7 where the time averaged LFG extraction rate is Qext. LFG extraction in FIG. 7 is presumed to be 1.5 Qext during the day and 0.5 Qext at night (12 hours each).

Common Issues and Effects with Perturbations

All 3 perturbations discussed above—mis-adjustments, barometric fluctuations and "peaking"—are closely comparable in several ways in their adverse effects:

Extraction at lower than optimal time averaged level ("underpull"), falling barometer and lower than average extraction as part of peaking have similar effects of increasing fugitive emission.

Conversely, extraction adjusted to flows above optimum ("overpull"), a rising barometer and the extraction of gas at greater-than-average flows to meet higher than average energy (peaking) needs all result in largely undesirable increases in air entrainment.

For convenience in discussion of perturbations that follows, the comparable (in effect) scenarios of overpull—rising barometer, and higher than average extraction to meet energy needs will be referred to as "situation A". The comparable scenarios of underpull—falling barometer, and/or lower than average extraction will be referred to as "situation B". The effects of more than one parameter can add together and exacerbate problems described next.

Figure 8:
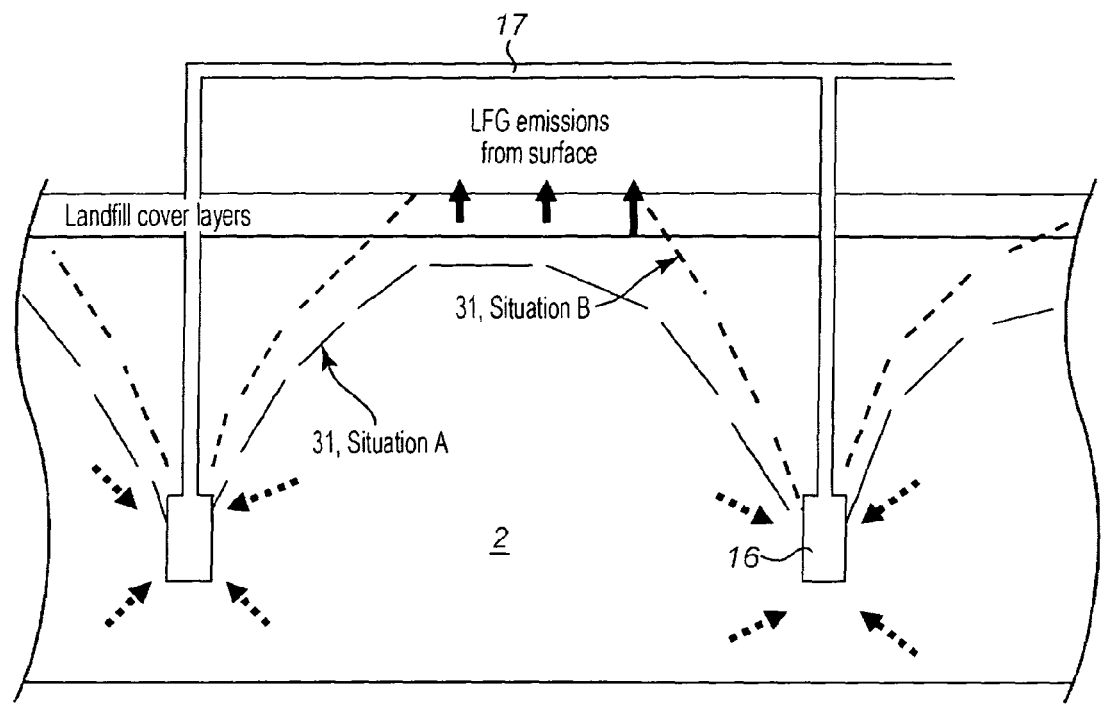
FIG. 8 shows a prior art landfill with a changing air/LFG interface position during overpull (situation A) or underpull (situation B) situations.

The effect of the perturbations in changing the location of the interface between LFG and air as originally shown in FIG. 6 is illustrated by examples in FIG. 8. A lower interfacial boundary or greater air entrainment is shown by air/LFG boundary 31 situation A in FIG. 8 resulting from inadvertent overpull during adjustment, a rising barometer, or higher than average extraction to meet higher-than-average energy or "peaking" needs. A higher boundary and greater fugitive atmospheric LFG emissions is shown by air/LFG interface boundary 31 situation B in FIG. 8 as an elevated interface representing the result of situation B—inadvertent underpull, falling barometer, or consequent to intervals of lower than average extraction rate.

Another problem with conventional constant rate extraction is how perturbations can vary composition of extracted gas. Most LFG fueled energy equipment is adapted from natural gas fired equipment. This equipment is designed for natural gas fuel of constant energy content (Augenstein and Pacey, 1992). Changing methane composition and gas energy content can be problematic, requiring continuing burner or carburetion adjustment as the energy content changes. Alternately the changing methane content can result in energy equipment malfunction. Thus keeping energy (methane) content of extracted gas as nearly constant as possible can be critically important for energy applications using extracted LFG.

With conventional gas extraction as described above, perturbations can cause variation in extracted gas composition. During situation B (=underpull) the methane in extracted gas tends to increase as nitrogen in the entraining air to the well becomes less. Conversely during situation A air entrainment increases and more air arrives at the wellhead or extraction locus and reduces methane content of the extracted gas as overpull continues.

Thus, with a conventional landfill, if extraction rates were varied during the day as shown in FIG. 7, during hours of peak extraction, situation A or overpull occurs and the methane content of the extracted biogas is lower, while during a nighttime period of reduced extraction rate, situation B or underpull occurs and the methane content of the extracted LFG is higher. Depending on magnitude, variations in composition of extracted gas fueling energy equipment can create serious problems. For example, it can necessitate continuing adjustment of burners, carburetion adjustments of engine equipment, or create equipment malfunctions.

An alternative approach to circumvent problems of varying LFG composition that others have used is to seriously "underpull", i.e. extract gas at well under generation rate. This yields extracted LFG of constant energy content (since air dilution can be close to nil), but also leads to wasted gas energy and atmospheric emissions of methane. The emissions and gas losses with this practice are definitely higher than desirable from climate and energy conservation standpoints.

Figure 2:
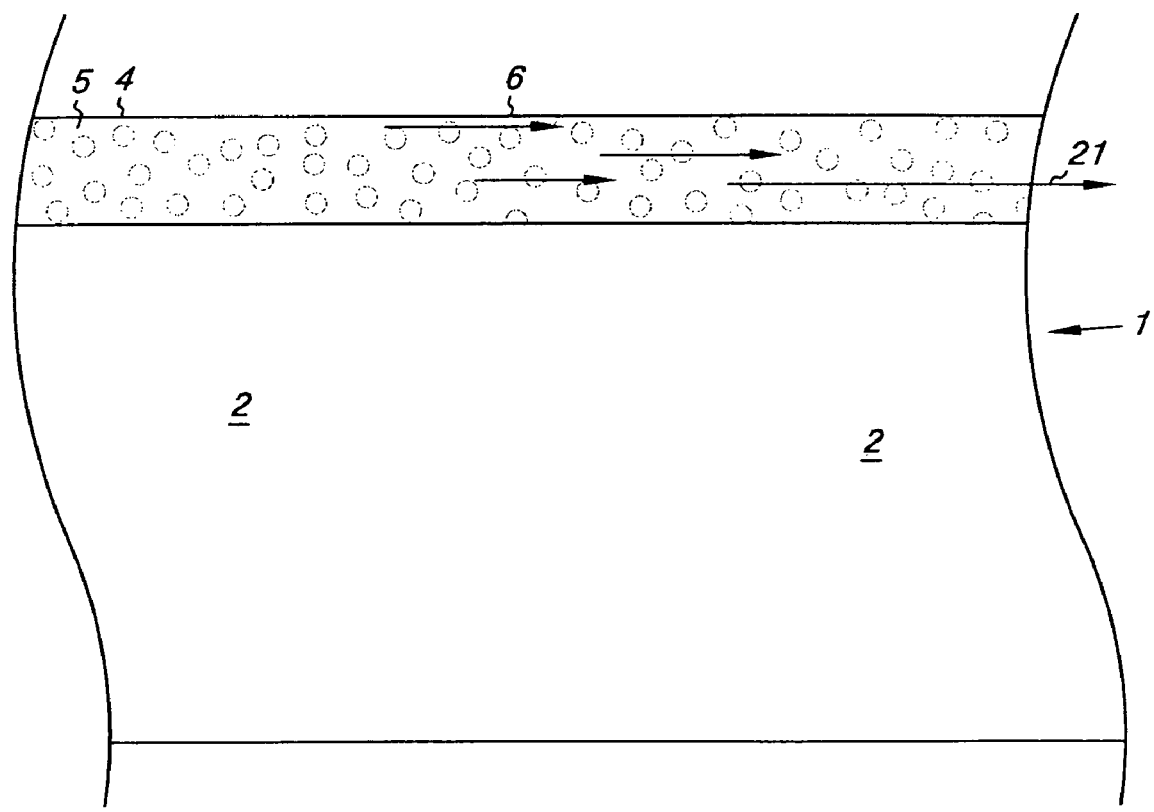
FIG. 2 shows another prior art landfill biogas collection system.

Geomembrane over a highly conductive layer. An innovation that partially ameliorates the inefficiency and air entrainment problems of gas collection by wells is to collect exploiting a surface geomembrane or barrier layer atop a surface or near-surface highly conductive layer. This landfill design and method is described by Dr. Stanley Zison in U.S. Pat. No. 4,442,90. A schematic of the Zison highly conductive layer recovery method is shown in FIG. 2.

U.S. Pat. No. 4,442,901 by Zison contemplated gas recovery from the highly conductive layer itself, as shown in FIG. 2. However withdrawal of gas from the highly conductive permeable layer has the problem (as with conventional extraction) that perturbations and associated overpull or underpull can cause substantial variation in energy content of LFG recovered from the highly conductive permeable layer, just as with conventional landfill design.

Given the above, an approach to lessen the adverse fugitive emissions and air entrainment consequences of perturbations while allowing greater collection efficiency would clearly be useful. The present invention accomplishes this via a combination of permeable layers and strategic location of the extraction locus. The present invention lessens the combined adverse consequences of fugitive LFG emissions, air entrainment and LFG concentration variations of the collected gas. It accomplishes these goals by a combination of a gas-permeable layer and appropriate location of the extraction locus or loci.

"Peaking"—Varying LFG Extraction Rates to Match Energy Needs.

FIG. 3 has illustrated one embodiment of the invention. The permeable layer in FIG. 3 is near the surface. In "situation B" or "underpull" the LFG that would escape the waste to the atmosphere absent the permeable layer instead enters the permeable layer when the permeable layer is present. Perturbations tend to be cyclic leading to sequential overpull and underpull or expansion and contraction of void gas (for example long term the barometric pressure increases or decreases in an irregularly cyclic fashion but returns repeatedly to the same point). Thus a situation A will follow situation B. LFG entering the permeable layer in "situation B" will in "situation A" that follows be re-entrained into the waste. Regardless of what factor is responsible—underpull, falling barometer or the lower extraction rate during the storage phase of "peaking," it can be established that with suitable adjustment the capture of gas by the permeable layer and its re-entrainment into the waste will lessen emissions and improve on capture that would otherwise occur with gas extraction without permeable layers. Since gas entraining in the vicinity of the well will always (with proper adjustment) contain a significant fraction of LFG rather than being pure atmospheric air the net air entrainment will be correspondingly lessened.

In view of this, another embodiment of the invention makes use of porous cover layers above the more highly permeable layer for storage and withdrawal of LFG. The cover layer 7, though orders of magnitude less permeable than the conductive highly permeable layer 5 is usually nonetheless porous. Many types of cover material such as soil or waste can serve as a gas-containment layer and are also porous.

Figure 9:
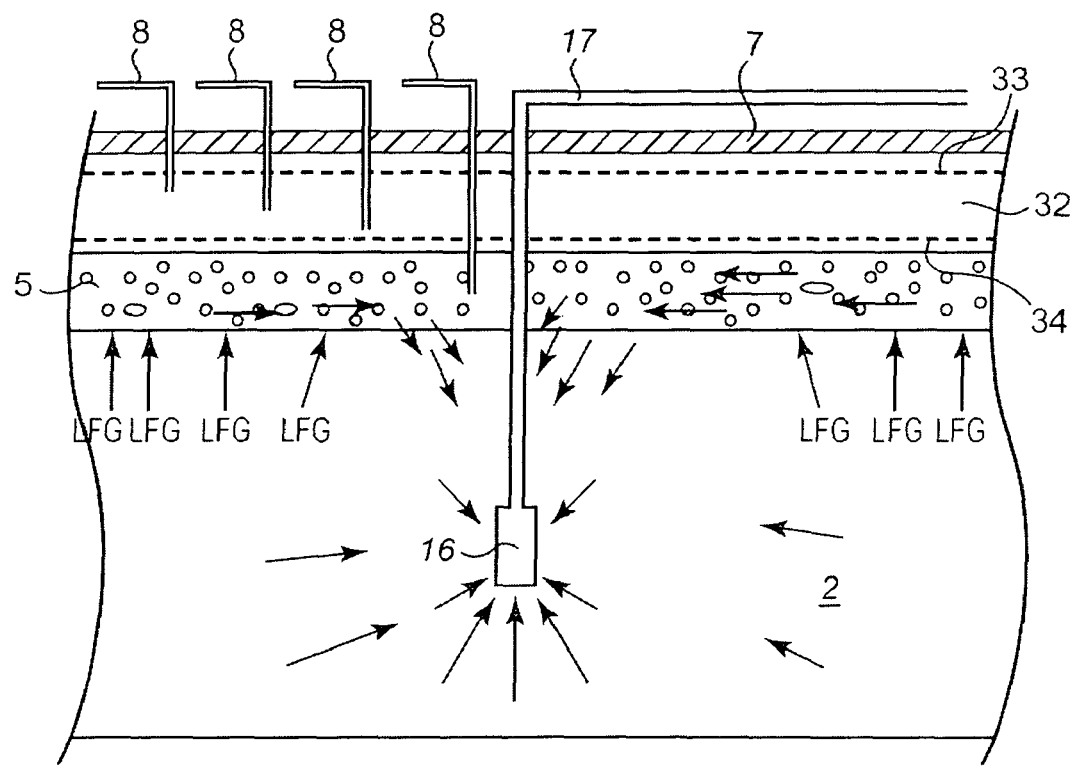
FIG. 9 shows movement of the air/LFG interface in a porous gas storage layer with a landfill design and collection method of the invention.

When there is sufficient depth of porous but less permeable cover over the permeable layer, the porous but less permeable cover layers that separate the permeable layer from the atmosphere can serve for gas-storage. With proper extraction rate adjustment an interface between contained LFG and entrained air can be maintained within a porous gas-storage layer (which may also be the gas containment layer) above the permeable layer. During "situation A" perturbations (overpull, etc.) the interface falls by the amount necessary to reflect the actual volume reduction of contained LFG due to the perturbation. Correspondingly, during situation B perturbations the upper boundary of LFG rises to reflect the increase. FIG. 9 shows the general arrangement with the porous gas-storage layer 32 overlaying the gas-permeable layer 5. A gas-containment layer 7 is also shown, although in some embodiments the gas-storage layer 32 and gas-containment layer 7 can be one and the same.

The porous gas-storage layer 32 should be less porous than the gas-permeable layer 5. It should have sufficiently small pores and particles to allow plug flow of gas, so that an air/methane interface is maintained in the porous gas storage layer. It may be made of any suitable material. Most commonly, it may be made of conventional landfill waste, e.g., household waste. It may also be other types of waste, but preferably it has less gas-permeability than the gas-permeable layer.

In FIG. 9, with "peaking" gas extraction, during a situation A (overpull) an air/LFG interface forms and moves down toward the lower bound of the air/LFG interface. During situation B (underpull) LFG tends to escape from the gas-permeable layer 5 into the porous gas-storage layer 32 and the air/LFG interface rises in the porous gas-storage layer 32 toward the upper bound 33 of the air/LFG interface. The porous gas-storage layer 32 should be thick enough that the upper bound 33 of the LFG/air interface stays within the gas-storage layer during a period of minimal gas extraction, falling barometer, or both. Preferably the lower bound 34 of the air/LFG interface also stays within the gas-storage layer 32 during a period of situation A (maximal gas extraction, rising barometer, or both).

Figure 10:
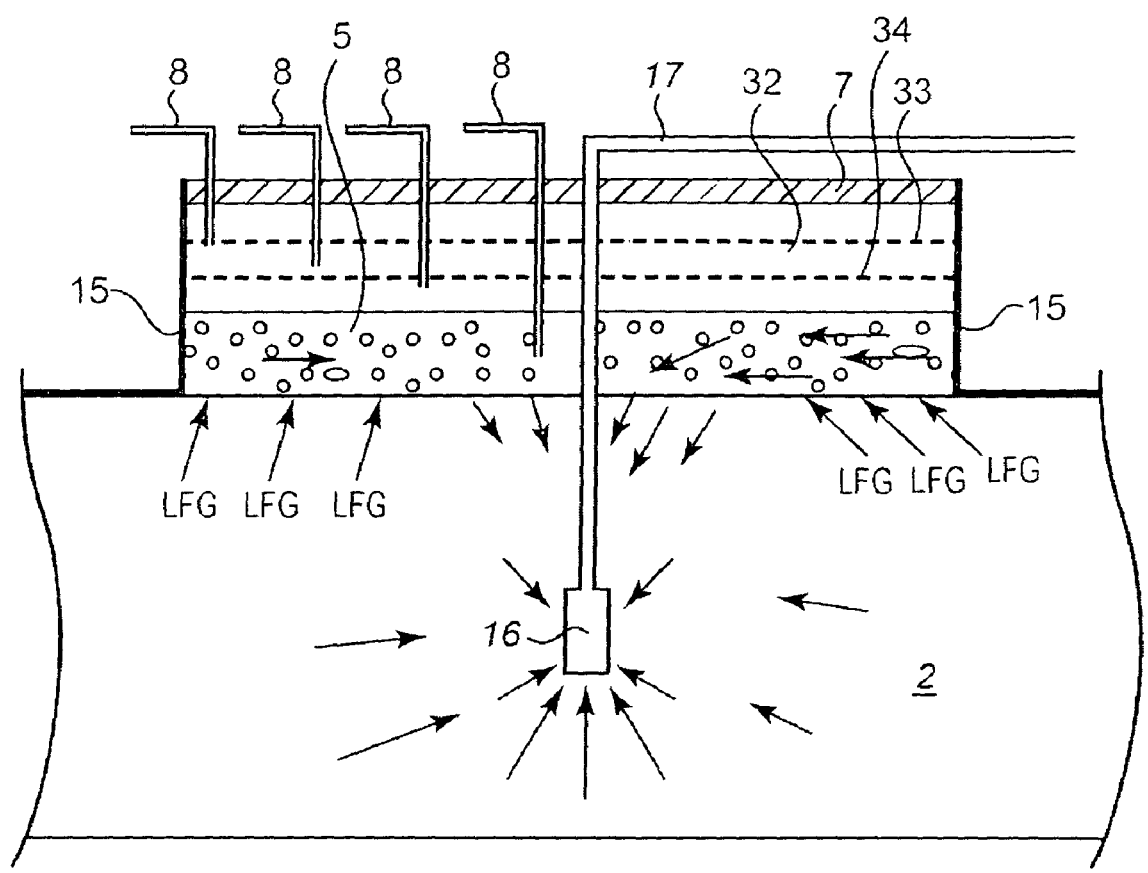
FIG. 10 shows a landfill with another arrangement of the gas-permeable layer and porous gas-storage layer.

It is also possible to have LFG stored, (i.e., captured and released) by porous cover or cover volumes having designs other than designs of standard covers. FIG. 10 shows one possible configuration of many that are possible, a cover with a thicker sector that can accommodate more gas-storage per unit area within the thicker sector. Such non-standard covers may be of any suitably porous material so long as gas can enter and be withdrawn with a residence time distribution that is close to "plug flow" residence time distribution as the term pertains to fluid flow. "Plug flow" as used herein, means that an air/LFG interface is maintained and moves back and forth through the gas-storage layer as the LFG collection rate cycles through periods of maximal and minimal extraction rate. We note that the material in the porous gas storage layer of FIG. 11 may advantageously consist of materials that must be disposed of anyhow, such as household waste. It may include rubble, or construction and demolition debris or scrap tires or the like. The inventory of LFG, rather than air, that can face the entrainment zone precludes the air entrainment that would ordinarily occur without such cover. FIG. 10 shows a geomembrane 15 covering the areas not covered by a gas-permeable layer 5 to prevent LFG escape and air entrainment.

The present invention for improved gas capture has the advantage of using practical modifications and commonly available construction materials at landfills. It can integrate with existing landfill operations at low incremental cost.

Achieving a more nearly constant extracted LFG composition (i.e., reduction of composition variation) is another key feature and benefit of the present invention that, as noted, can be critical for energy use. The reduction of composition variation occurs via this mixing or "time averaging" of elements of the entraining gas, that may have differing compositions, on the way to the wellhead (which may be a gas-collection trench) beneath the permeable layer. This mixing and attainment of more nearly constant composition depends on the depth by which extraction lies beneath and is separated from the permeable layer as discussed next.

Depth of Extraction Locus Beneath Permeable Layer.

Aside from highly efficient capture, with minimization of air entrainment and emissions, another highly important goal of this invention is to ensure composition of extracted gas that is substantially less variable than it would otherwise be if extracted from zones such as the permeable layer. In other words the purpose is to assure an extracted gas stream as close to constant in its methane energy content as possible. The concentration of gases in the permeable conductive layer might vary substantially due to perturbations. As noted these variations can be very problematic for energy uses if the LFG of variable composition were extracted from the conductive layer. The value of separating the deeper extraction locus (wellhead) from the conductive layer lies in facilitating the mixing of entraining gas on the way to the separated deeper extraction locus. Even if composition of gas entering waste in the entrainment area may vary somewhat over hours or days, the multiple flow paths and associated dispersive and diffusional mixing as the gas moves toward the deep extraction zone will "time average" the concentration and minimize variations. Given a long enough transit time of gas from the surface entrainment area to the deep extraction zone, diffusion will tend to further even out the composition variations. The transit time is preferably at least 24 hours. In other embodiments it is at least 48 hours.

Figure 11:
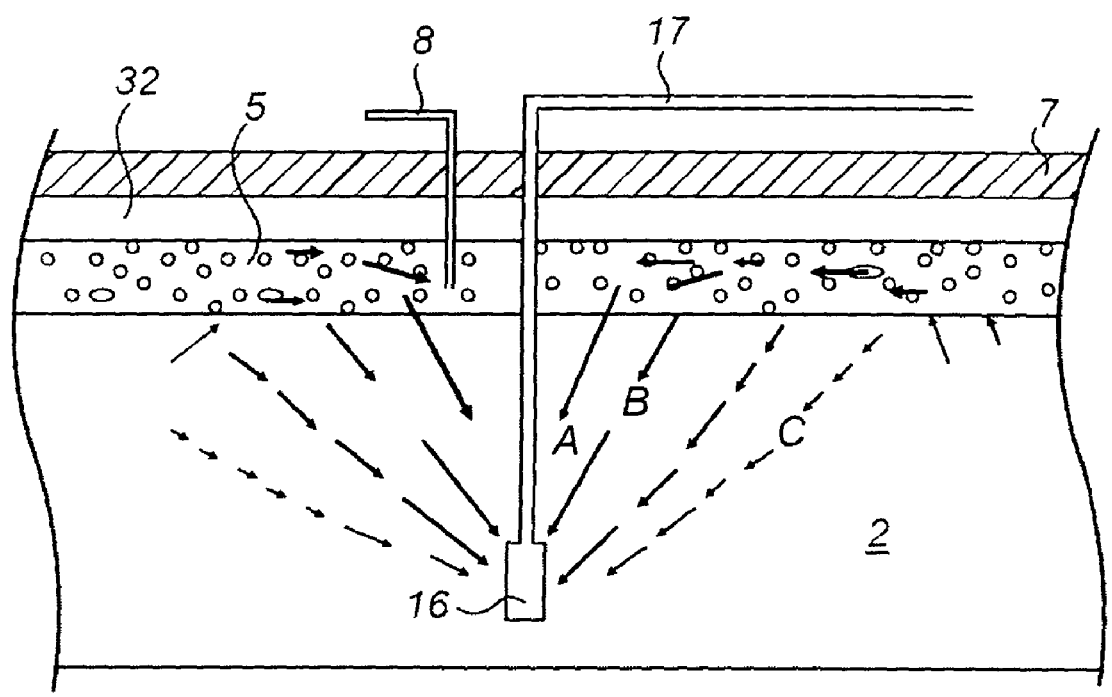
FIG. 11 is a schematic diagram showing the distribution of gas-flow rates and transit times from different locations of the permeable layer to the biogas-collection wellhead. Larger arrows indicate faster gas flows.
Figure 12:
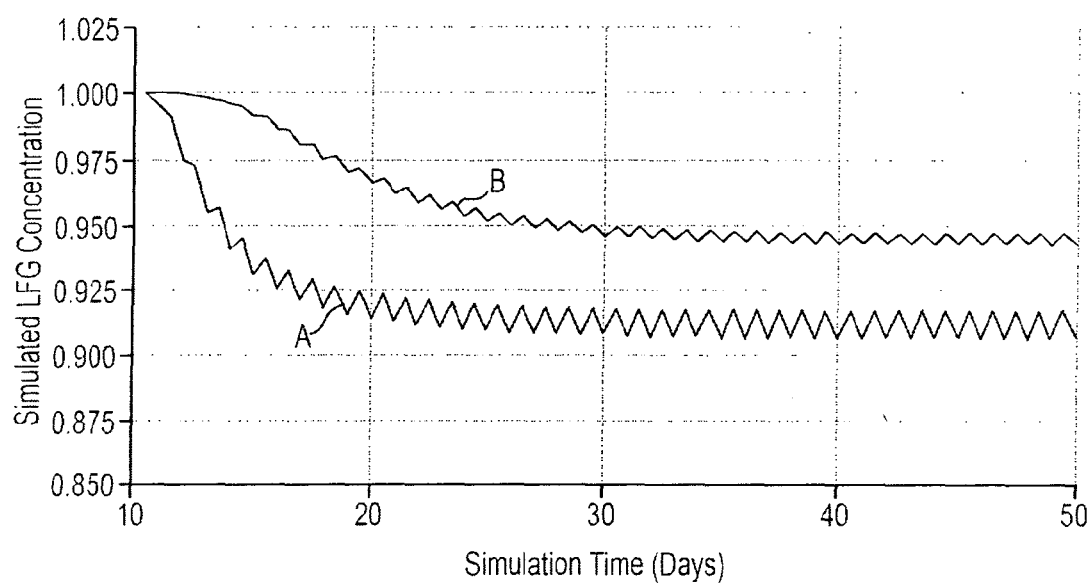
FIG. 12 shows a comparison of the extracted LFG composition versus time with cyclic "peaking" biogas collection using a conventional landfill design (A, lower trace) or the present landfill design with a gas-permeable layer (B, upper trace).

FIG. 11 shows with lengths of arrows how the velocity of gas elements passing from different points in the entrainment zone to the extraction locus will differ. This results in different transit times, and a necessary consequence of this dispersion of transit times is mixing. Any variation in composition of the gas in the permeable layer will be "time averaged" out to result in a much more constant (less variable) composition of gas reaching the extraction locus, compared to composition in the permeable layer. The differing transit time of gas elements can assure, for example, that gas representing the average of several days' permeable layer composition will be mixed before arriving at the extraction locus. The mixing of gas representing the average of several days' permeable layer composition results in a deep gas pool whose composition is close to constant, and certainly much less variable than the composition of gas as it enters waste beneath the LFG entrainment zone.

If, with the present invention, LFG is extracted from base layers of the landfill, there may also be some mixing of gas on the way to the base layers and thereby resulting benefit in terms of more constant composition. In this case the dispersion in transit times is dependent on factors such as heterogeneity of permeability from one to another location in the landfilled waste. This heterogeneity in waste was not relied on elsewhere because its exact features cannot be known, but dispersion of gas elements in their transit from (a) the near surface permeable layer as well as (b) gas elements generated in the bulk waste beneath the permeable layer and traveling is likely.

A key issue then, is separation necessary between the conductive layer and the deeper extraction locus to assure desirable and/or necessary degrees of mixing.

Gas flow in a waste medium can be treated for the simplified analytical case as a situation of flow in a medium of constant and isotropic (similar in all directions) permeability. Though flow is in fact more complicated, the simplified treatment gives highly relevant information. For the simplified case a minimum calculated degree of mixing occurs when differing flow paths alone are considered (without considering diffusion or dispersion). Clearly, the degree of mixing will be greater the longer the interval between transit times of gas elements from the permeable layer to the extraction locus. Conversely, as one counterexample to more desirable practice, if the extraction locus is located immediately adjacent to the permeable layer, the transit time of all elements is short and the composition of extracted gas would vary in close synchrony with that of the permeable layer and there will be little effect of mixing on reducing the concentration variations occurring in the extracted gas compared to entraining gas.

Dimensional analysis indicates that the degree of mixing through a medium of reasonably constant permeability and homogeneity, as represented by "ideal" landfilled waste, will be a highly positively correlated function of a parameter related to the transit time of gas in the permeable layer to the extraction locus. Although the transit time of gas in the permeable layer to the extraction locus can be long or short, inspection of FIG. 11 and intuition will indicate that the distribution of transit times of faster moving elements of gas (coming along path A) relative to slower moving elements of gas (coming along paths B and C) will be greater the deeper the extraction locus (well or trench). Even though the gas in the permeable layer may vary in composition, a sufficiently deep well will allow elements of gas to arrive at successively greater intervals. The mixture of gas contents representing, for example, several days composition results in a situation where the gas extracted by the deep extraction well is relatively constant even though the permeable layer composition may vary.

From dimensional analysis, the transit time from the permeable layer to the extraction locus that gives acceptable mixing is directly proportional to $$Ep = (Dw)^3 (\epsilon/Qg)$$

Where
$(Dw)^3$ is the cube of the well depth.
Qg is total LFG generation in the volume served by the well per unit time.
The parameter $\epsilon$ is porosity, which is the fraction of volume in waste that is gas-filled.
The parameter Ep has the dimensions of time. Depending on the degree of mixing desired, a desirable value is in the neighborhood of one day. It is to be noted that the Ep of one day is a choice based on the value for mixing deemed acceptable. The inventors estimate that an Ep of 1 day would reduce concentration fluctuation by about half compared to collecting from the permeable layer. Lower values of Ep would give less mixing. Higher values of Ep would give more mixing (i.e., more averaging out of concentration ion fluctuations and more nearly constant composition) and these would be matters of choice with the invention.

From the above, a desirable well depth deemed to give suitable mixing is given by $$Dw = (EpQg/\epsilon)^{1/3}$$

In applying this correlation, other parameters must be defined that are specific to given situations and/or to the range of likely situations. These could include interval over which concentration changes are likely to occur in the permeable layer, porosity, and the value of Q that must be used in determining the correct value of Ep. Many pertinent parameters are fixed by the normal parameters of waste landfills and kinetics of methane generation behavior. Cycle time is likely to be no more than a day for the most interesting case of diurnal (day-night) peaking and at this cycle time Ep should be at least 1 day. (A higher Ep will take care of longer perturbation cycle times)

Calculations in Appendix B give an expected value for conventional landfills of Qg, the value of gas generation in the landfill section served by a well $$Qg = Aw \times Dl \times 0.0157 \text{ m}^3/\text{day}$$

Where Aw is landfill area served by the well and associated permeable layer, Dl is depth of landfill and the product of Aw×Dl is the volume of waste served by the extraction locus and associated permeable layer.

Given an assumed porosity (gas-filled void fraction) of 0.25 similar to estimates by others for example Bentley et al.

$$Dw = (Ep=1)(0.0157 \text{ m}^3/\text{day})(Aw \times Dl)/0.25$$

And canceling out, $$Dw = 0.0628(Aw \times Dl)^{1/3}$$

So, for an example where a well serves an area of 10,000 M² in a landfill of 30 meters depth, the depth of the well to achieve a 24-hour average gas transit time from the permeable layer to the wellhaid is $$0.0628 \times (10,000 \text{ m}^2 \times 30 \text{ m}) = 4.2 \text{ meters}.$$

These criteria for Ep encompass the most likely situations. For situations such as with a "bioreactor landfill" where there can be up to tenfold higher specific gas generation and considerably lower porosity (such as 0.10) the similarly calculated depth of a well serving the same waste volume as above would need to be 12.2 meters or close to threefold deeper. In general, for a bioreactor, to attain the same constancy of concentration as a conventional landfill the extraction locus should be about 2-4 times deeper below the permeable layer as with a conventional (non-bioreactor) landfill.

The other parameter that may vary is the cycle time for perturbations, that is, the characteristic time for a complete cycle fr, during which there will be "overpull" extraction exceeding generation and "underpull." For the present a default value of 1 day is claimed as appropriate and more discussion of factors leading to this choice are in Example 1, Appendix B.

Control:

For the simplest situation of FIG. 3, extraction rate adjustment of individual wells can be by control methods similar to adjustments of conventional constant rate extraction: If wellhead methane content is above a "target level" (it could be for examples 40% or 50% depending on desired capture efficiency, allowable air entrainment and needs of the energy application fueled by the landfill gas) extraction rate is increased. If below the target level the extraction rate is decreased. The process is continued until wellhead methane or LFG is as close as feasible to the chosen target level. The adjustments can alternatively be based on concentration of an air gas, preferably nitrogen.

Alternatively, the composition of the LFG in the permeable layer may be sampled as described in U.S. patent application Ser. No. 11/187,639 (publication no US 20060034664), which is incorporated by reference. The sampling may be from a point in the entrainment area (see FIG. 3) or if breaches or deficiencies in the cover area are expected, the sampling may be at multiple points to give indications of the location of leaks, which will be reflected in greater air dilution and lower methane along points in the flow path within the permeable layer from the leak to the entrainment zone.

When gas reaching the entrainment area of the permeable layer gas is sampled, there will be correlation between the profile of gas composition sampled at strategic points versus time and the resultant extracted gas composition versus time. Thus such a correlation will allow quick adjustments to achieve a desired wellhead composition.

The means for sampling and control of in-cover storage, can be as was shown in FIG. 9. The interface level can be sensed by sensors or gas composition sampling lines. These can be at strategic locations in the cover that is serving for storage, and/or in the permeable layer. The locations of sample lines to sense the location and the rise and fall of the LFG interface shown in FIG. 9 are examples only. As to control of the gas stored in the cover, in cases where the interface is too low the level of that interface can be adjusted upward by reducing extraction flow. If the interface within the porous cover is too high (which would threaten to cause atmospheric emissions and LFG losses) the extraction rate can be raised. The adjustment and control of extraction rate can rely on any or all of the wellhead methane content (or other indicator gas content, e.g., nitrogen), the methane (or other gas) concentration in the highly conductive permeable layer, and the level of the entrained air/methane interface as sensed by sensors.

The invention enables an increase in capture efficiency and decreased fugitive emissions in comparison to conventional extraction. Conventional extraction is defined here as that using deep wells or extraction loci alone (without the permeable layer). In comparison to conventional extraction without the permeable layer, the invention will lessen the adverse effects of several perturbations to landfill gas extraction. Perturbations are defined as those factors that have the effect of increasing or decreasing the inventory of gas contained in the landfill. Perturbations include mis-adjustments of extraction rate, perturbations due to fluctuations in barometric pressure, and purposeful cyclic variation of LFG extraction rate to meet varying needs for landfill gas energy.

Among the adverse effects of perturbations that the present invention lessens in comparison to conventional extraction are (1) Variations in gas composition and specifically methane energy content of extracted biogas. These variations are undesirable for energy uses. (2) Undesirable fugitive LFG emissions and associated LFG energy losses. (3) Undesirable amounts of air entrainment that have adverse effects on methane generation and recovery.

Specific Embodiments of the Invention

The invention is based on a method of collecting biogas from a landfill having an outer surface (typically the upper surface) contacting the atmosphere, wherein the landfill contains (i) at or near the outer surface contacting the atmosphere a gas-containment layer that has low gas permeability; and (ii) a gas-permeable layer toward the interior of the landfill from the gas-containment layer and toward the exterior of most of the landfill waste mass, the gas-permeable layer having at least 10 times the gas-permeability of the gas-containment layer. The method involves collecting biogas from the landfill from a location toward the interior of the landfill from the gas-permeable layer with at least one gas-collection well that collects biogas from an extraction location toward the interior of the landfill from the gas-permeable layer and separated by waste from the gas-permeable layer and draws it to the surface, the well comprising a biogas-collecting wellhead at the extraction location and a conduit linking the wellhead to the surface to draw biogas from the wellhead to the surface. Preferably the conduit is gas-impermeable.

Preferably, little if any biogas is collected directly from the gas-permeable layer—less than 10% of the volume of biogas collected from the landfill beneath the gas-permeable layer through the at least one gas-collection well.

The invention involves collecting biogas at a maximal rate for at least one hour and a minimal rate for at least one hour in the same day, wherein the maximal rate of biogas collection in a day is at least 20% more than the minimal rate of biogas collection in the same day for at least two consecutive days.

In one embodiment of the invention, the outer surface contacting the atmosphere is an upper surface of the landfill, the gas-permeable layer is underneath the gas-containment layer and above most of the landfill waste mass; and the biogas extraction location is underneath and separated by waste from the gas-permeable layer.

In one embodiment of the methods of the invention, if any biogas is collected directly from the gas-permeable layer, it is less than 2% of the volume of biogas collected from the landfill from the extraction location located toward the interior of the landfill from the gas-permeable layer through the at least one gas-collection well.

In another embodiment, the method includes monitoring composition of gas of the gas-permeable layer.

In another embodiment, the method includes monitoring composition of gas in the porous gas-storage layer.

After monitoring the composition of the gas of the gas-permeable layer, the method can include adjusting the rate of biogas collection from the landfill from the extraction location located toward the interior of the landfill from the gas-permeable layer through the at least one gas-collection well based on the composition of gas in the gas-permeable layer. In general, the rate of biogas collection is decreased if the gas in the gas-permeable layer or in the porous gas-storage layer contains more air gases than desired or less methane than desired. If the gas in the gas-permeable layer contains no air, the rate of biogas collection may be increased. If the rate of collection of biogas is too low, biogas may escape from the surface of the landfill by rising through the landfill. But if the rate of collection of biogas is too high, air may be entrained into the landfill to fill the low pressure zone around the biogas wellhead created by too rapid withdrawal of biogas. The air then contaminates the biogas, decreasing its quality, and contributes to an oxygenating environment in at least some zones of the landfill, which can lead to oxidation of methane and a reduction in microbial anaerobic fermentation that produces biogas. A reasonable target is 2-20% $N_2$ content of the gas in the gas-permeable layer, or a content of other air gases that would indicate equivalent air content in the gas-permeable layer.

In particular embodiments, the composition of the gas in the gas-permeable layer is monitored by gas chromatography, gas conductivity, or infrared spectroscopy.

Preferably, the gas in the gas-permeable layer is sampled for monitoring at a point within a 50-foot radius, parallel to the orientation of the gas-permeable layer (i.e., a 50-foot horizontal radius if the gas-permeable layer is horizontally oriented), of the wellhead of the gas-collection well, more preferably within a 30-foot radius.

Biogas collection through the gas-collection well generates an entrainment zone of the landfill beneath the gas-permeable layer (where the outer surface of the landfill contacting the atmosphere is the upper surface), the entrainment zone defined as a 2-dimensional area immediately underneath the gas-permeable layer through which at least 30% of gas passing from the gas-permeable layer to the gas-collection wellhead passes. In some embodiments, the landfill comprises a gas-impermeable membrane underneath the gas-permeable layer and overlying the entrainment zone, the gas-impermeable membrane defining an aperture through the membrane through which gas from the gas-permeable layer passes to the gas-collection wellhead; wherein the step of monitoring composition of gas in the gas-permeable layer comprises monitoring gas at or near the aperture through the gas-impermeable membrane.

The gas-permeable layer and the gas-containment layer should cover most or all of the of the landfill surface area, particularly in the zone of the landfill where biogas is being collected. In some embodiments, the area of the gas-containment layer and the area of the gas-permeable layer are each at least 50%, at least 80%, or at least 90% of the landfill outer surface area contacting the atmosphere.

The gas-permeable layer has at least 10 times, preferably at least 100 times, more preferably at least 1000 times, and more preferably still at least 10,000 times the gas permeability of the gas-containment layer.

The greatest pressure differentials arise in the entrainment zone, so the greatest risk of air drawdown into the landfill arises at the landfill surface above the entrainment zone. Thus, to prevent this, in a particular embodiment, the gas-containment layer in areas over the entrainment zone has at least 30% lower average gas permeability than the gas-containment layer in areas not over the entrainment zone. In another embodiment, the landfill comprises at or near (e.g., within 1 meter) the surface of the landfill a gas-impermeable layer comprising continuous wood or clay over most or all of the entrainment zone to prevent air flow into the landfill from the atmosphere above the entrainment zone. In another embodiment, the landfill comprises a gas-impermeable geomembrane in or above the gas-containment layer and vertically overlaying most or all of the entrainment zone to prevent gas flow from the atmosphere above the entrainment zone. In particular embodiments, the gas-containment layer area over the entrainment zone has an average thickness at least 30% greater than the gas-containment layer area not over the entrainment zone.

In particular embodiments, the gas-containment layer is predominantly soil.

In particular embodiments, the gas-containment layer is predominantly clay.

In particular embodiments, the gas-containment layer comprises a synthetic membrane.

In particular embodiments, the gas containment layer is located at the base or side layers of the landfill, where those layer contact the atmosphere, either directly or indirectly by means of an available flow path to the atmosphere (such as a base leachate collection system that conducts gas to the atmosphere), with the proviso that the permeable layers are present in the direction of the waste interior to the containment layer.

The gas-permeable layer is generally permeable because it has relatively large pores between particles in the layer, or large interconnected pores within the layer. For instance, clay is a good material for the gas-containment layer because it has very small particles and small to non-existent pores between particles. In contrast, gravel and shredded tire are good materials for the gas-permeable layer because they have large rigid or semi-rigid particles that generate considerable gas voids between particles.

Thus, in particular embodiments, the gas-permeable layer comprises predominantly rigid or semi-rigid particles with an average particle diameter of 1 mm or greater, wherein gas-flow passages exist between the particles. The particles may be, for instance, gravel, pebbles, shredded tire, pieces of construction debris, paving debris, concrete chunks, wood debris, wood pallets, wood branches, wood logs, wood twigs, or wood chips.

In a particular embodiment, the gas-permeable layer comprises a network of apertured conduits oriented generally parallel to the surface contacting the atmosphere. The horizontal gas flow through the gas-permeable layer may be primarily through these conduits.

In a particular embodiment, the gas-permeable layer comprises an apertured transmissive layer that is two parallel screens with space between screens to conduct gas.

The porous gas-storage layer should have lower permeability (smaller pore sizes) than the gas-permeable layer. It typically has larger pores sizes than the gas containment layer. It is typically composed of ordinary waste. It may include some of the elements found in the gas-permeable layer, such as construction debris or shredded tires. It may be the same layer as the gas-containment layer or include some materials found also in the gas-containment layer, such as soil or household waste.

In particular embodiments, the methods of the invention include adding moisture or nutrients or both to the landfill mass to promote biogas formation in the landfill.

In particular embodiments, the methods include heating a portion or the whole of the landfill mass to promote biogas formation in the landfill.

In one embodiment, the landfill comprises a porous gas-storage layer that is proximal to the atmosphere relative to the gas-permeable layer, wherein the gas-storage layer stores biogas, and an interface between biogas and air forms during biogas collection, and the interface is maintained in the gas-storage layer during periods of the minimal rate of biogas collection. The porous gas-storage layer preferably covers at least 50% of the area of the gas-permeable layer. The porous gas-storage layer may be composed of ordinary waste. Preferably the interface between biogas and air is also maintained in the porous gas-storage layer during periods of the maximal rate of biogas collection.

In one embodiment, the method further comprises monitoring location of the interface between biogas and air in the porous gas-storage layer.

The porous gas-storage layer should have sufficient gas storage volume to accommodate the excess volume of biogas produced in the landfill during the time period of below-average biogas collection when biogas collection varies between a minimum rate and maximum rate during a day. At the most, the daily need for gas storage in the porous gas-storage layer would be half the daily total biogas production volume. Initial daily production of biogas from a landfill (production will decrease over time) is estimated in Appendix B of Example 1 below to be 0.0157 $m^3$ biogas/$m^3$ landfill volume per day. The porosity of waste is most commonly from 0.15 to 0.3. Thus, if the porous gas-storage layer is waste, it would have approximately 150-300 liters gas storage capacity per m porous gas-storage layer volume. From these calculations, it can be determined that the porous gas-storage layer in one suitable case would have a volume of about $\frac{1}{40}$ of the volume of the underlying landfill. The necessary volume of the porous gas-storage layer will depend on the porosity of the gas-storage layer, the LFG production rate of the landfill, and the difference between the maximal and minimal rates of biogas collection in a day.

In specific embodiments, the porous gas-storage layer is at least 1 m deep and covers at least 75% of the area of the gas-permeable layer.

The method may also involve monitoring composition of gas at one or more points in the porous gas-storage layer in order to detect air entrainment into the gas-storage layer or movement of the biogas-air interface in the porous gas-storage layer.

The method may also involve adjusting the rate of biogas collection from the landfill from the extraction location toward the interior of the landfill from the gas-permeable layer through the at least one gas-collection well based on the location of the interface between biogas and air in the porous gas-storage layer or based on gas composition in the gas-storage layer.

The average transit time of gas from the gas-permeable layer to the biogas-collecting wellhead is preferably at least 1 day (24 hours) to allow appropriate gas-mixing during transit and time-averaging of the composition of the collected biogas. The transit time can be estimated as described above. It can also be experimentally measured. One method of experimentally measuring transit time would be to place an inert tracer gas, such as neon, in the gas-permeable layer and then measure the time until the tracer gas appears in gas collected from the well.

In other embodiments, the average transit time for biogas passing from the gas-permeable layer to the biogas-collecting wellhead is at least 2 days.

The biogas-collecting wellhead is typically separated from the gas-permeable layer by at least 5 feet (1.5 meters) of waste. In other embodiments, it is separated by at least 10 feet (3 meters) or at least 15 feet (5 meters). The wellheads may typically be separated from the gas-permeable layer by about 20 feet (6.5 meters) of waste.

In particular embodiments, the method includes monitoring composition of gas in the gas-permeable layer. In a more specific embodiment, it further involves adjusting the rate of biogas collection from the landfill from the extraction location toward the interior of the landfill from the gas-permeable layer through the at least one gas-collection well based on the composition of gas in the gas-permeable layer.

More specifically, in one embodiment the rate of biogas collection is decreased if the gas in the gas-permeable layer contains more air gases than desired or less methane than desired.

In particular embodiments, the method includes monitoring composition of gas in the porous gas-storage layer. In a more specific embodiment, it further involves adjusting the rate of biogas collection from the landfill from the extraction location toward the interior of the landfill from the gas-permeable layer through the at least one gas-collection well based on the composition of gas in the porous gas-storage layer.

In particular embodiments, the method includes monitoring composition of gas at a plurality of points in the porous gas-storage layer to determine location of an air/methane interface in the porous gas-storage layer. In a more specific embodiment, it further involves adjusting the rate of biogas collection from the landfill from the extraction location toward the interior of the landfill from the gas-permeable layer through the at least one gas-collection well based on the location of the air/methane interface in the porous gas-storage layer.

The adjustments in rate of biogas collection can be adjustments in the average daily rate of biogas collection or in the immediate rate of biogas collection.

The collected biogas preferably has minimal air contamination, even where air contamination varies between a maximum and a minimum each day as the maximal rate of biogas collection entrains more air into the landfill and the minimal rate of biogas collection during the day entrains less air. In specific embodiments of the method, the collected biogas contains less than 9%, less than 8%, less than 7% less than 6%, or less than 5% air contamination. (I.e., the collected biogas contains less than the given percentage air by volume at the maximal level of air contamination during the day.)

In specific embodiments, the percent air in collected biogas varies by no more than 1.0%, 0.9%, 0.8%, 0.6%, or 0.5% within the two consecutive days. (I.e., a maximum contamination level of 5% air and a minimum of 4% air would be a variance of 1%.)

In other embodiments the methane content of collected biogas varies by less than 5%, 4%, 3%, 2%, 1%, 0.7%, or 0.5% within the two consecutive days.

In other embodiments the methane content of collected biogas varies by less than 5%, 4%, 3%, 2%, 1%, 0.7%, or 0.5% over 30 consecutive days.

In some embodiments, rate of collecting biogas is varied in response to need for fuel.

One advantage of including the gas-permeable layer and the present design of using gas-collection wells with wellheads below the gas-permeable layer and separated from the gas-permeable layer by waste is that fewer gas-collection wells are needed. This is because biogas, after rising through the landfill to reach the gas-permeable layer, moves laterally in the gas-permeable layer until it reaches the vicinity of a gas-collection well, where it is entrained into the landfill again toward the gas-collection wellhead. Thus, in some embodiments, the landfill contains a plurality of the gas-collection wells and the number of gas-collection wells is less than half the number that would be required in an otherwise identical landfill lacking the gas-permeable layer.

Another embodiment of the invention provides a method of collecting biogas from a landfill having an upper surface contacting the atmosphere, wherein the landfill contains (i) at or near the outer surface contacting the atmosphere a gas-containment layer that has low gas permeability; and (ii) a gas-permeable layer toward the interior of the landfill from the gas-containment layer and toward the exterior of most of the landfill waste mass, the gas-permeable layer having at least 10 times the gas-permeability of the gas-containment layer. The method involves collecting biogas from the landfill from a location toward the interior of the landfill from the gas-permeable layer with at least one gas-collection well that collects biogas from an extraction location toward the interior of the landfill from the gas-permeable layer and separated by waste from the gas-permeable layer and draws it to the surface, the well comprising a biogas-collecting wellhead at the extraction location and a conduit linking the wellhead to the surface to draw biogas from the wellhead to the surface. In specific embodiments, the biogas-collecting wellhead is separated from the gas-permeable layer by at least 1.5 meters, at least 3 meters, or at least 5 meters of waste. In other specific embodiments, average transit time of biogas from the gas-permeable layer to the biogas-collecting wellhead is at least 24 hours.

EXAMPLES

Example 1

Modeling the Effect and Benefits of the Present Invention Versus Conventional Extraction To provide an example and validate the invention's benefit in lessening of fugitive emission and air entrainment in the presence of perturbations, the inventors retained Hydro Geo Chem Inc of Tucson Ariz., to conduct flow modeling of the situation where peaking occurs from a landfill sector served by a single well. The modeled situation was that of an actual test as proposed to be carried out at the Central Landfill at Yolo County California USA. The important features are summarized as follows.

A test area of 160×320 feet was chosen within a much larger module of over 10 acres. A permeable layer containing shredded tires was installed 6 feet below the landfill surface of the 160×320-foot test area. The extraction locus was comprised of a "pancake" or flat laterally extended 30-foot wide circular extraction locus (i.e., a 30-foot wide wellhead). This wellhead was in turn located 10 feet below the permeable layer. The modeled extraction rate was 4% greater than the assumed generation.

This well configuration is an unusual variation on conventional practice constructed for certain experimental purposes. But its use illustrates a point, that an extraction locus other than perforated wellbore (slotline) of a vertical well, or a trench, will work with our invention so long as other criteria are met.

In this situation a comparison of the invention was made with conventional extraction. The compared cell configuration and operations were identical except for the presence or absence of the permeable layer.

The results are shown in FIG. 13. The extraction is assumed to start with the landfill test footprint and void volume full of pure landfill gas. In the figure 100% LFG is pure landfill gas with no air. After about 20 days of extraction the LFG content of recovered gas reaches a cyclic, repeating but otherwise steady state where LFG content cycles between a peak content (when extraction is a minimum or situation B as defined above) and a minimum content (when extraction is a maximum or a situation A as defined above). The LFG concentrations are affected by the perturbation of cycling as was shown in FIG. 5. LFG contents vary less between peak and minimum when a permeable layer is present. When there is no permeable layer the concentration of LFG in recovered gas was calculated to cycle between a minimum of 90.6 and 91.6% pure with average recovery of 91.1% ie there is 8.9% of generated LFG that is fugitive to the atmosphere. When this particular case of recovery with permeable layer present is modeled, the LFG concentration in recovered gas cycles between about 94.2 and 94.7%. The fugitive emissions with permeable layer present are 5.6%. Thus the magnitude of the concentration variations fell by 40% and the fugitive emissions fell by 26% with the particular arrangement of this example. While the performance of the control is good, the performance of the invention is better. This clearly illustrates the value of the permeable layer in improving extraction in the presence of perturbations. For reasons stated earlier, the general approach would be similarly valuable whether the perturbation is extraction cycling to meet varying energy demands or perturbation from the inevitable barometric fluctuations that affect all landfills or in correcting short term mis-adjustments. It is to be noted that the operating parameters were simply those chosen for an initial trial and there was no attempt to optimize them.

APPENDIX A. EXAMPLE OF BAROMETRIC EFFECTS ON RECOVERY OF LFG FROM WASTE

The LFG Generation from conventionally landfilled waste has been extensively investigated. The typical bounds on generation of LFG waste are discussed and referenced below in Section A-1. This generation, less any LFG recovery, results in a net vertical flux component through the surface of the landfill. Aside from the flux that is directly due to LFG generation, or generation and recovery, additional surface gas fluxes resulting from barometric fluctuations are superposed on flux resulting from the combination of generation and extraction. It is straightforward to calculate the superposed barometrically related flux as shown in Section A-2. For example, it is calculated for a landfill without extraction how the superposed barometrically induced flux may for example result in total surficial, predominantly outward gas fluxes that vary as much as from zero to twice the time-average of the flux due to generation. For a landfill where LFG extraction for capture of gas and control of emission may equal or typically slightly exceed generation, it is also seen from calculations below relying on Sections A-1 and A-2 how the cyclic barometric variations and resulting perturbations can result in alternations between (a) substantial entrainment of atmospheric air, and (b) a situation of undesirable surface emissions and losses of LFG energy to the atmosphere. It is thus evident how barometrically induced perturbations can potentially pose a serious interference to constant rate recovery of reasonably constant LFG composition.

Section A-1

LFG Generation by "Typical" Conventional Landfills

The rates of (and bounds on) LFG generation from conventional landfills are well established from prior studies, in particular Vogt and Augenstein (1997) who examined gas recovery from 19 landfills (in a US Department of Energy supported study for the Solid Waste Association of North America, SWANA). For present purposes the critical findings of this study were:

(a) That the normalized generation rates of LFG ranged downward from a median peak level of about 0.009 $m^3$/(tonne–day) (tonne=metric ton) or about $4 \times 10^{-4}$ $m^3$ tonne per hour.

(b) That the generation/recovery was best described by an exponentially declining rate (the widely used "EPA generation model").

(c) With this observed generation profile, half of the ultimate gas yield will be generated at less than $2 \times 10^{-4}$ $m^3$/tonne hour as generation characteristically declines.

With a density for placed waste of 700-850 kg/cubic meter (ca 1200-1450 lb/cubic yard) the range of methane generation rates per unit volume will range from $3.4 \times 10^{-4}$ ($m^3$ gas/$m^3$ waste-hr). Half or more of the aggregated long-term gas generation occurs below the median of $1.7 \times 10^{-4}$ $m^3$ gas/$m^3$ waste-hr. This is used in the example calculation that follows, comparing surface gas flux due to generation with surface flux due to barometric effects.

As an example we chose a mass of waste that is generating methane at slightly above the median rate, at about $2 \times 10^{-4}$ $m^3$ gas/$m^3$ waste-hr). A depth of waste 25 meters (84 feet) deep is chosen for illustration purposes. At this generation rate and waste depth, it is straightforward to calculate generation beneath a one square meter of footprint as $5 \times 10^{-3}$ $m^3$/hour. Without extraction, the surface flux due to generation alone—disregarding barometric effects—would thus be $5 \times 10^{-3}$ m/hr, or 0.5 cm/hour for this example. This generation, is in fact extracted at constant rate, with, as noted above, generally some slight excess extraction (overpull), resulting in air penetrating the landfill. As discussed above, with such constant extraction (and slight overpull) methane emissions measured by surface scans are normally well within regulatory bounds.

Section A-2. Landfill Void Gas, and Barometrically Induced Flux

Solid waste, placed in and reposing in landfills, typically contains gas-filled voids, (since "flooding, even with bioreactors, is not allowed). The volume of this void fraction is difficult to estimate, but indirect indicators exist. Indicators are the gas permeability of waste and the compressibility of waste to greater-than-landfill densities using high pressure compactors. Further, "as landfilled" waste can "imbibe" nominally about 25-35% of its weight in water (see for example Augenstein et al., 2003) without any increase in waste volume. This waste compressibility and ability to imbibe water would not be possible unless void space gas is a high fraction of the waste volume. The inventors estimate that the void volume fraction is typically 25-30%, but can vary from perhaps 15% to 35%.

Changes in barometric pressure have been shown by several workers to rapidly transmit to this void gas in waste, so that equilibrium with ambient barometric pressure is reached with lag times of a few minutes to at most an hour throughout the waste (Lu and Kunz, 1981) and (Bentley et al., 2002). The effect of these pressure fluctuations, particularly on composition and exsolving $CO_2$, has been examined in a detailed mathematical analysis by Young (1991).

At an example void fraction of 25% and depth of 25 meters, the voids beneath the landfill surface amount to about 6 cubic meters of gas-filled void or pore space beneath each square meter. A change in barometric pressure readings can be about 0.1% per hour. Changes of 1% in absolute atmospheric pressure on a diurnal basis are routine. One example is as follows: Over California's large central valley in the summer, solar heating heats low level air and causes barometric pressure to first fall in the morning from about 30.15 inches Hg to 29.85 inches Hg, with nightfall reversing this trend. The barometric pressure changes are about in the order of 0.08% per hour, over a 24 hour day. This barometric behavior is generally true for the entire US West Coast, around the Great Lakes, the Gulf Coast and the Eastern seaboard, where over half the US population and landfills are located.

Such barometric changes will superimpose additional gas flux due to expansion or contraction of the void gas. For the present example, 6 $m^3$ of void gas beneath the surface, flux from a 0.08%/hr change in barometric pressure will be about 0.5 cm per hour, assuming (as is the case) that pressure differentials equilibrate within less than an hour. The net result of barometric effects for our example is that during a rising barometer (at night) the average gas flux out of the landfill is reduced to near zero. During the day, with a falling barometer, the surface gas flux doubles from the daily average.

APPENDIX B. ESTIMATION AND SUPPORTING CALCULATIONS OF NEEDED SEPARATION OF DEEP WELL OR DEEP EXTRACTION LOCUS FROM OVERLYING PERMEABLE LAYER

The vertical distance by which the deeper extraction locus is separated from the overlying permeable layer is critical in reducing methane concentration variations by the mixing mechanisms outlined in the text. This calculates the criteria for necessary depth. This calculated estimate of a distance criterion below requires knowledge or estimation of several parameters. These include the interval over which perturbations occur, the generation rate of gas being recovered by an individual well, waste porosity and density, and other factors as detailed below.

Criterion for Ep (transit time from the permeable layer to the extraction locus). To reduce the concentration variation acceptably in a medium (such as waste) by over 60% (for example reducing a permeable layer concentration variation where methane concentration ranges from 40% to 50% to a range of 43% to 47% in a time span T (such as a day where T=24 hours) over which concentration varies, we estimate an acceptable value of Ep should equal or exceed one day.

Interval of perturbation cycling. The variable extraction to meet "peaking" and "off peak" energy demands will in most practical cases be expected to usually vary over a characteristic period of a day, but this time can vary. The repeating and irregular weather related variation in barometric pressure of greatest concern, in which atmospheric pressure departs from and returns to the long term mean usually occurs within the order of 1 day to (rarely) 1 week with the shorter perturbations. Note that the barometer will ultimately return to a starting point.

Generation within waste volume served by an extraction locus. There are accepted correlations to predict likely bounds (upper or lower values) of the generation rate of gas from a mass or alternately volume of landfilled waste. One model, based on waste mass, is that of the US Environmental Protection Agency (US EPA) version of L and GEM 3.02, posted May 12, 2005 and downloadable from the US EPA website www.epa.gov/ttn/catc/pruducts.html. Another set of model parameters that was developed in a study co-authored by one of the present inventors is Vogt and Augenstein. It must be recognized that input parameters may vary. The generation parameters should however be values that are supported as logically expected at landfills, for example in the work of Vogt and Augenstein. For our modeling estimate of gas generation in a waste volume served by an individual well the inventors chose parameters in metric units that are conservative in translating to a minimum bound on separation or depth of the extraction locus from the permeable layer (note that the separation can be greater). For calculating initial generation per cubic meter of landfilled waste.

Waste density=800 $Kg/m^3$.

Lo—yield of LFG from waste=180 $m^3$ per metric ton (=Megragram), or 144 $m^3$ gas/$m^3$ waste.

K=0.04 $year^-$.

Qo=initial generation rate

And the terminology is $m^3$=1 cubic meter of component in question, whether gas, in-place landfilled waste, etc Kg=kilogram Lo=total yield of LFG from beginning to end of generation, per kilogram K=first order rate constant, units reciprocal time From these value the maximum rate of generation, experienced as waste degradation starts, is 0.0157 $m^3/m^3$-day.

Characteristic time of a perturbation is taken to be one day (a degree of mixing that addresses problems associated with a one day perturbation cycle will address problems associated with a longer term as well) The porosity of landfilled waste is also needed to determine Ep. The porosity of landfills can vary but is generally above 0.10 and most commonly from 0.15 to 0.3.

Concentration cycling To reduce the concentration variation acceptably in a medium (such as waste) by over 60% (for example reducing a permeable layer concentration variation where methane concentration ranges from 40% to 50% to a range of 43% to 47% in a time span T (such as a day where T=24 hours) over which concentration varies, the value of Ep should equal or be greater than 1 day. The variable extraction to meet "peaking" and "off peak" energy demands will in most practical cases be expected to vary over a period of 24 hours. The repeating and irregular weather related variation in barometric pressure, starting and returning to the long term mean usually occurs within the order of 1 to 3 days. Longer term variations are of lesser effect and consequently of lesser concern. Also note the constraint on barometric changes that the barometer will return to a starting point, in such fashion that long term effects of barometric perturbations will be minimized.

Porosity The porosity of landfills can vary but is generally above 0.10 and most commonly from 0.15 to 0.3. The spacing of wells lies between one and five times the depth of the wells. All of the above factors, together, lead to the stated judgment of the inventors that the reasonable minimum bound on separation of the extraction locus from the permeable layer should be $$Dw=0.0628(Aw \times Dl)^{1/3}$$

Where Aw is landfill area served by the well and associated permeable layer, Dl is depth of landfill and the product of Aw×Dl is the volume of waste served by the extraction locus and associated permeable layer. Dw is the suggested minimum separation of the extraction locus (wellhead) from the gas-permeable layer.

REFERENCES

Augenstein, D. and J. G. Pacey 1992. Landfill Gas Energy Utilization: Technology Options and Case Studies US EPA report EPA-600/R-92-16.

Augenstein, D. J. Benemann, R. Yazdani, H. Bentley, P. Imhoff "Landfill Methane Capture Using Permeable Layers. Available on the Lulea Technical University, Sweden, website Abstract Proceedings of the 4th Intercontinental Landfill Research Symposium in Gallivare Sweden, June 2006. available at epubl.ltu.se/1402-1536/2006/05/LTU-TR-0605-SE.pdf. Pages 43-44.

Augenstein, D. et al. 2005. U.S. published patent application 2006003464.

Bentley, H. W., S. J. Smith, J. Tang, and G. Walter. 2002. A Method for Estimating the Rate of Landfill Gas Generation by Measurement and Analysis of Barometric Pressure Waves. Hydro Geo Chem, Inc. Tucson, Ariz.

EMCON Associates, "Methane Generation and Recovery from Landfills" Ann Arbor Press, 1981.

Johnson, K. R. Bauer and J. Velez 2005. The Influence of Barometric Pressure on Subsurface Landfill Gas Movement and Landfill Compliance. Proceedings, 2005 SWANA Landfill Gas Conference, San Diego, Calif. March. SWANA, Silver Spring, Md.

Simons, George Director, Public interest Energy Research program, 2004, citing personal communications of Patrick Sullivan SCS Engineers.

Spokas, K. J. Bogner, J. Chandon M. Morcet C. Aran C. Graff Y. Moreau Le Golvan and I Hebe 2005 Methane Mass Balance at Three Landfill Sites: What is the Efficiency of Capture by Gas Cllection Systems? Waste Management (Journal) appeared September online SWANA—i.e. Solid Waste Association of North America (SWANA) and National Renewable Energy Laboratory (NREL) Landfill Gas Operation and Maintenance Manual of Practice, SWANA, Silver Spring Md., 1997

Young, Alan. 1991 The Effects of Fluctuations in Atmospheric Pressure on Landfill Gas Migration and Composition. Water, Air and Soil Pollution vol. 64

Vogt. W. G. and D. Augenstein 1997 A 19-Landfill Comparison of Models for Predicting Gas Recovery from Municipal Waste Landfills. Prepared for Solid Waste Association of North America (SWANA), and United States Department of Energy. SWANA, Silver Spring Md.

Zison, S. 1984. Landfill Gas Recovery Method. U.S. Pat. No. 4,442,901.

All patents, patent documents, and other references cited are hereby incorporated by reference.

What is claimed is:

1. A method of collecting biogas from a landfill having waste and an outer surface contacting the atmosphere, wherein
   the landfill contains (i) at or near the outer surface contacting the atmosphere a gas-containment layer that has low gas permeability; and (ii) a gas-permeable layer toward the interior of the landfill from the gas-containment layer and toward the exterior of most of the landfill waste mass, the gas-permeable layer having at least 10 times the gas-permeability of the gas-containment layer;
   the method comprising:
   (a) collecting biogas from the landfill from a location toward the interior of the landfill from the gas-permeable layer with at least one gas-collection well that collects biogas from an extraction location toward the interior of the landfill from the gas-permeable layer and separated by waste from the gas-permeable layer and draws it to the surface, the well comprising a biogas-collecting wellhead at the extraction location and a conduit linking the wellhead to the surface to draw biogas from the wellhead to the surface;
   wherein step (a) comprises collecting biogas at a maximal rate for at least one hour and a minimal rate for at least one hour in the same day, wherein the maximal rate of biogas collection in a day is at least 20% more than the minimal rate of biogas collection in the same day for at least two consecutive days.

2. The method of claim 1 wherein if any biogas is collected directly from the gas-permeable layer, it is less than 10% of the volume of biogas collected from the landfill from the extraction location toward the interior of the landfill through the at least one gas-collection well.

3. The method of claim 1 wherein the landfill comprises a porous gas-storage layer that is proximal to the atmosphere relative to the gas-permeable layer, wherein the gas-storage layer stores biogas, and an interface between biogas and air forms during biogas collection, and the interface is maintained in the gas-storage layer during periods of the minimal rate of biogas collection.

4. The method of claim 3 wherein the interface is maintained in the porous gas-storage layer during periods of maximal rate of biogas collection.

5. The method of claim 3 further comprising monitoring location of the interface between biogas and air in the porous gas-storage layer.

6. The method of claim 3 wherein the porous gas-storage layer is at least 1 m deep and covers at least 75% of area of the gas-permeable layer.

7. The method of claim 1 wherein average transit time for biogas passing from the gas-permeable layer to the biogas-collecting wellhead is at least 1 day.

8. The method of claim 1 wherein the biogas-collecting wellhead is separated from the gas-permeable layer by at least 1.5 meters of waste.

9. The method of claim 1 further comprising monitoring composition of gas in the gas-permeable layer.

10. The method of claim 9 further comprising adjusting the rate of biogas collection from the landfill from the extraction location toward the interior of the landfill from the gas-permeable layer through the at least one gas-collection well based on the composition of gas in the gas-permeable layer.

11. The method of claim 10 wherein the rate of biogas collection is decreased if the gas in the gas-permeable layer contains more air gases than desired or less methane than desired.

12. The method of claim 9 wherein the outer surface contacting the atmosphere is an upper surface of the landfill, the gas-permeable layer is underneath the gas-containment layer and above most of the landfill waste mass; and the biogas extraction location is underneath and separated by waste from the gas-permeable layer;

wherein biogas collection through the gas-collection well generates an entrainment zone of the landfill beneath the gas-permeable layer, the entrainment zone defined as a 2-dimensional area immediately underneath the gas-permeable layer through which at least 30% of gas passing from the gas-permeable layer to the gas-collection wellhead passes;

wherein the landfill comprises a gas-impermeable membrane underneath the gas-permeable layer and overlying the entrainment zone, the gas-impermeable membrane defining an aperture through the membrane through which gas from the gas-permeable layer passes to the gas-collection wellhead; and wherein the step of monitoring composition of gas in the gas-permeable layer comprises monitoring gas at or near the aperture through the gas-impermeable membrane.

13. The method of claim 1 wherein rate of collecting biogas is varied in response to need for fuel.

14. The method of claim 1 wherein if any biogas is collected directly from the gas-permeable layer, it is less than 2% of the volume of biogas collected from the landfill from the extraction location located toward the interior of the landfill from the gas-permeable layer through the at least one gas-collection well.

15. The method of claim 1 wherein the area of the gas-permeable layer and the area of the gas-containment layer are each at least 50% of the landfill outer surface area contacting the atmosphere.

16. The method of claim 1 wherein the area of the gas-permeable layer and the area of the gas-containment layer are each at least 90% of the landfill outer surface area contacting the atmosphere.

17. The method of claim 1 wherein the gas-permeable layer has at least 1000-fold the gas permeability of the gas-containment layer.

18. The method of claim 1 wherein the gas-containment layer is predominantly soil.

19. The method of claim 1 wherein the gas-containment layer is predominantly clay.

20. The method of claim 1 wherein the gas-containment layer comprises a synthetic membrane.

21. The method of claim 1 wherein the gas-permeable layer comprises predominantly rigid or semi-rigid particles with an average particle diameter of 1 mm or greater, wherein gas-flow passages exist between the particles.

22. The method of claim 21 wherein the particles are gravel, pebbles, shredded tire, pieces of construction debris, paving debris, concrete chunks, wood debris, wood pallets, wood branches, wood logs, wood twigs, or wood chips.

* * * * *